United States Patent
Rolston et al.

(10) Patent No.: US 11,722,031 B2
(45) Date of Patent: Aug. 8, 2023

(54) COMPONENT FOR A POWER GENERATION SYSTEM

(71) Applicant: Cummins Generator Technologies Limited, Peterborough (GB)

(72) Inventors: Robert Rolston, Peterborough (GB); Mark Riley, Peterborough (GB)

(73) Assignee: Cummins Generator Technologies Limited, Peterborough (GB)

( * ) Notice: Subject to any disclaimer, the term of this patent is extended or adjusted under 35 U.S.C. 154(b) by 297 days.

(21) Appl. No.: 17/247,623

(22) Filed: Dec. 18, 2020

(65) Prior Publication Data

US 2021/0111607 A1    Apr. 15, 2021

Related U.S. Application Data

(63) Continuation of application No. PCT/GB2019/051737, filed on Jun. 20, 2019.

(30) Foreign Application Priority Data

Jun. 22, 2018  (GB) .................................... 1810271

(51) Int. Cl.
*H02K 5/20* (2006.01)
*H02K 5/16* (2006.01)
(Continued)

(52) U.S. Cl.
CPC .............. *H02K 5/207* (2021.01); *H02K 5/16* (2013.01); *H02K 7/1815* (2013.01); *H02K 9/06* (2013.01)

(58) Field of Classification Search
CPC ........ H02K 5/207; H02K 5/16; H02K 7/1815; H02K 9/06
See application file for complete search history.

(56) References Cited

U.S. PATENT DOCUMENTS 2,899,573 A * 8/1959 Wesolowski ........... H02K 3/527
310/60 R
3,261,994 A * 7/1966 Franz ....................... H02K 3/24
310/64
(Continued)

FOREIGN PATENT DOCUMENTS

CN     112313859 A  *  2/2021  ............... H02K 5/16
CN     114499043 A  *  5/2022  ............... H02K 7/18
(Continued)

OTHER PUBLICATIONS

International Search Report and Written Opinion issued in International Application No. PCT/GB2019/051737 dated Sep. 18, 2019, sixteen (16) pages.

(Continued)

*Primary Examiner* — Pedro J Cuevas
(74) *Attorney, Agent, or Firm* — Foley & Lardner LLP

(57) ABSTRACT

A component for connection between a generator and a prime mover in a power generation system is disclosed. The component may be an adaptor (20, 50, 110) or a bracket (80, 90), and may be arranged to house a fan. The component comprises a rear member (24), a front member (22), and a plurality of cross members (26) which connect the front member to the rear member. The cross members are wedge-shaped and/or lie at an angle with respect to a radial direction. The component may be arranged to surround a fan. The component may facilitate airflow and enhance thermal performance while being efficient from a structural and cost perspective.

20 Claims, 21 Drawing Sheets

(51) Int. Cl.
*H02K 7/18* (2006.01)
*H02K 9/06* (2006.01)

(56) References Cited

U.S. PATENT DOCUMENTS

| | | | | |
|---|---|---|---|---|
| 4,010,377 | A * | 3/1977 | McKenzie | B63H 20/14 |
| | | | | 290/46 |
| 4,608,946 | A * | 9/1986 | Tanaka | F02B 63/04 |
| | | | | D13/116 |
| 5,086,246 | A * | 2/1992 | Dymond | H02K 9/06 |
| | | | | 310/58 |
| 5,899,174 | A * | 5/1999 | Anderson | F02B 77/13 |
| | | | | 290/1 A |
| 6,094,797 | A * | 8/2000 | Sherman | H02K 7/1815 |
| | | | | 29/469 |
| 8,205,581 | B2 * | 6/2012 | Hatsugai | F02B 63/04 |
| | | | | 290/1 R |
| 8,334,633 | B2 * | 12/2012 | Hazeyama | H02K 9/06 |
| | | | | 310/263 |
| 11,025,131 | B2 * | 6/2021 | Barekar | F02B 63/00 |
| 11,059,599 | B2 * | 7/2021 | Rabbi | H02K 1/16 |
| 11,177,720 | B2 * | 11/2021 | Sarder | F02B 63/044 |
| 11,289,978 | B2 * | 3/2022 | Kim | F01P 1/06 |
| 2003/0095867 | A1 * | 5/2003 | Bankstahl | F04D 29/281 |
| | | | | 416/204 R |
| 2004/0256923 | A1 * | 12/2004 | Cleanthous | H02K 11/046 |
| | | | | 310/58 |
| 2010/0176603 | A1 * | 7/2010 | Bushnell | H02K 9/06 |
| | | | | 310/63 |
| 2010/0213775 | A1 * | 8/2010 | Naghshineh | H02K 11/05 |
| | | | | 310/194 |
| 2011/0012449 | A1 * | 1/2011 | Hazeyama | H02K 9/06 |
| | | | | 310/64 |
| 2014/0346780 | A1 | 11/2014 | Holder | |
| 2016/0301284 | A1 | 10/2016 | Wilson et al. | |
| 2016/0329778 | A1 | 11/2016 | Kaneko | |
| 2018/0205286 | A1 * | 7/2018 | Barekar | F02B 63/00 |
| 2019/0123618 | A1 * | 4/2019 | Agrawal | H02K 5/20 |
| 2019/0356198 | A1 * | 11/2019 | Sarder | H02K 5/207 |
| 2020/0169146 | A1 * | 5/2020 | Kim | H02K 9/06 |
| 2021/0107664 | A1 * | 4/2021 | Rabbi | B64C 11/10 |
| 2022/0009644 | A1 * | 1/2022 | Rabbi | B64D 27/24 |
| 2022/0037957 | A1 * | 2/2022 | Agrawal | F04D 29/541 |

FOREIGN PATENT DOCUMENTS

| | | | | |
|---|---|---|---|---|
| JP | 5285310 B2 * | 9/2013 | | F02B 63/04 |
| WO | WO-2009122586 A1 * | 10/2009 | | H02K 21/044 |
| WO | WO-2017/009626 A1 | 1/2017 | | |
| WO | WO-2017/158322 A1 | 9/2017 | | |
| WO | WO-2019243829 A1 * | 12/2019 | | H02K 5/16 |

OTHER PUBLICATIONS

Search Report issued in GB Patent Application No. GB1810271.5 dated Dec. 10, 2018, four (4) pages.

* cited by examiner

COMPONENT FOR A POWER GENERATION SYSTEM

This application is a continuation of PCT/GB2019/051737 filed Jun. 20, 2019, which claims priority to United Kingdom Patent Application No. 1810271.5 filed Jun. 22, 2018, the entire contents of which are incorporated herein by reference.

The present invention relates to a component for connection between a generator and a prime mover in a power generation system. The invention has particular, but not exclusive, application as an adaptor for connecting the generator to the prime mover, and/or as a bracket for supporting a bearing.

Power generation systems typically comprise a prime mover connected to a rotating electrical machine. For example, a generating set may comprise an internal combustion engine, such as a diesel engine, coupled to a generator (alternator). The engine is used to drive the generator, in order to generate the output power. This is achieved by mechanically connecting rotating parts of the engine and the generator. The engine and the generator are typically both mounted on a bed frame. An adaptor may be used to connect non-rotating parts of the generator and the engine, such as the generator frame and a flywheel housing. The adaptor may convert one set of connections on the generator to another set of connections on the prime mover. Use of an adaptor helps to prevent relative movement between the engine and the generator.

Many rotating electrical machines, particularly those of a larger design, require some form of cooling. This may be achieved by providing a fan which forces air flow through the machine. The fan may be mounted on the rotor shaft, and may be driven directly by the prime mover. Alternatively, an independently-driven fan may be provided. The fan may either push or pull air through the machine. Air flow through the machine is usually in a generally axial direction. The main paths for the air flow are usually through the rotor/stator airgap, and through an airgap between the stator core and the stator frame.

In existing adaptor designs, the fan may be mounted on the machine shaft inside the adaptor. Air outlets may be provided in the adaptor in order to provide an exit path for airflow through the machine. The air outlets may also provide access for an operator to connect rotating parts of the prime mover and the electrical machine during assembly.

Many power generation systems use a single bearing design. In this case, the generator has a single bearing for supporting one end of the shaft, and the other end of the shaft is supported by bearings in the engine. An adaptor connects the generator frame to the flywheel housing, and may also house a fan.

Other power generation systems use a two-bearing design. In this case a bracket may be provided which connects to the generator frame and which supports a bearing. The bracket may also house a fan. Some two-bearing designs do not have the generator frame connected directly with the engine housing, and rely on rigid connections with the bed frame. If it is desired to connect a two-bearing machine with the engine housing, a separate adaptor may be fitted between the two-bearing bracket and the engine housing. Alternatively, these two components (the adaptor and the bracket) may be provided as one piece.

WO 2017/158322 in the name of the present applicant, the subject matter of which is incorporated herein by reference, discloses an adaptor with four asymmetric air outlets. The adaptor is arranged to provide an increase in the cross-sectional area of the air flow towards the outlet. This can allow a progressive reduction in air velocity to be achieved within the adaptor towards the outlet. This may help to improve the overall amount of cooling air passing through the machine for a given fan input power.

The adaptor disclosed in WO 2017/158322 has been found to provide a significant improvement in the cooling flowrate with a corresponding reduction in winding temperatures. However, it has been found that on some machines, such as larger-frame machines, the shape of the adaptor presents challenges from a mechanical strength and cost perspective. In particular, the structural limitations imposed by the design may increase the weight, size and/or cost of the adaptor.

WO 2017/009626 in the name of the present applicant, the subject matter of which is incorporated herein by reference, discloses an adaptor which is optimised in terms of the amount of material used for a given stiffness, rather than for improved airflow.

It would therefore be desirable to provide a component for connection between a generator and a prime mover which is efficient from a structural and cost perspective and which also provides good air-flow and thermal performance.

According to a first aspect of the present invention there is provided a component for connection between a generator and a prime mover in a power generation system, the component comprising:
   a rear member;
   a front member; and
   a plurality of cross members which connect the front member to the rear member,
   wherein the cross members are wedge-shaped.

The present invention may provide the advantage that, by using wedge-shaped cross members, it may be possible to achieve good air-flow and thermal performance using a component which is also efficient from a structural and cost perspective.

By wedged-shaped it is preferably meant that the cross members have two exterior surfaces which meet together at an inner edge. For example, the cross members may have three exterior surfaces, each of which is connected with the other two, preferably along an edge. When viewed in axial cross section, the cross members may have an approximately triangular shape. However, one or more of the surfaces may be curved rather than planar. Furthermore, the cross members may have more than three exterior surfaces (for example, 4, 5, 6 or more).

Preferably the rear member is arranged to be located on the generator side of the component, while the front member is arranged to be located on the prime mover side of the component. Either or both of the rear and front members may be in the form of an annular ring. The rear member and the front member may each be arranged to surround a rotating component, such as a shaft between the generator and the prime mover. Preferably the rear member and the front member are aligned axially. Preferably the cross members extend between the rear member and the front member in an axial direction.

The rear member may be arranged to connect to the generator. Preferably, the rear member is arranged to connect to a non-rotating part of the generator, such as the generator frame (housing). For example, the rear member may comprise a plurality of bolt holes for bolting the component to the generator frame, although other connection means may be used instead or as well.

The front member may be arranged to face the prime mover. For example, the front member may be arranged to connect to the prime mover and/or to support a bearing. In one arrangement, the front member is arranged to connect to a non-rotating part of the prime mover such as a flywheel housing. The front member may comprise a plurality of bolt holes for bolting the component to the flywheel housing or other similar component of the prime mover, although other connection means may be used instead or as well.

The component is preferably arranged to surround a rotating part of the power generation system, such as a shaft and/or a fan. For example, the component may be an adaptor for connecting the generator to the prime mover, and/or a bracket for supporting a bearing. The cross members may be spaced circumferentially about the component, in order to connect the front member to the rear member, while surrounding a rotating part. The component may have an interior which lies in a notional surface which is substantially cylindrical, in order to allow rotation of a rotating part such as a fan.

The component is preferably arranged to house a fan, such as a cooling fan for drawing cooling air through the generator. This may allow the component to perform more than one function, such as connecting the generator to the prime mover and/or supporting a bearing, as well as housing a fan. Preferably the component is arranged such that air flow from the fan passes between adjacent wedge-shaped cross members.

Preferably the wedge-shaped cross members have an edge on the radially inwards end of the cross member. For example, each of the cross members may have an inside edge which lies in a notional surface which is substantially cylindrical. By providing the cross member with an edge on the radially inward end, the wake blockage of the cross member may be reduced, thereby improving airflow.

Each cross member may have two side surfaces, each of which extends between the radially outwards end of the cross member and the radially inwards end of the cross member. The two side surfaces may also extend in a substantially axial direction between the front member and the rear member. Preferably the two side surfaces are inclined with respect to each other, and preferably meet together at an edge at the radially inwards end of the cross member. The angle of inclination between the two side surfaces is preferably acute, for example greater than 0°, 5° or 10° and/or less than 45°, 35° or 30°, although other values may be used instead. The edge may be rounded off, for example with a radius of curvature of at least 0.5, 1, 2 or 3 mm and/or less than 15, 10, 8 or 7 mm (e.g. approximately 5 mm) although other arrangements are possible.

The cross members may have an outside surface which extends between the two side surfaces, on the radially outwards end of the cross member. The outside surface may for example lie in the outer periphery of the component. Preferably the outside surface also extends in an axial direction between the front member and the rear member. Alternatively, the outside surface may be discontinuous.

Preferably the two side surfaces are longer than the outside surface (for example when measured around the periphery of the cross member). Thus, the side surfaces may have a length in a radial direction which is greater than the length of the outside surface in the circumferential direction. Furthermore, one side surface may be longer than the other (although it would also be possible for their lengths to be the same).

Preferably the width of the cross member (for example the distance between the two side surfaces) increases with increasing distance from the inside of the component. This may help to ensure that the cross members have sufficient material to provide the required structural strength and rigidity, while reducing wake blockage.

The cross members may have an axial cross section (i.e. when viewed in a plane which is perpendicular to the axis of the machine) which is substantially triangular. In this case, one vertex of the triangle may lie on the radially inwards side of the cross member, while the other two vertices may lie on the radially outwards side of the cross member. For example, the two outer vertices may lie in the outer periphery of the component. Such an arrangement may help with airflow through the component.

Alternatively, the cross members may have an axial cross section which is V-shaped, and/or which has a plurality of sides.

It has been found that, in certain arrangements where a fan is used to draw cooling air through a generator, the airflow may exit the fan at an angle which is close to tangential (at an acute angle to the tangent). It has therefore been found pursuant to the present invention that airflow may be improved by inclining the cross members relative to a radial direction (i.e. a direction extending radially outwards from the centre of the component and/or the axis of rotation of the machine).

Thus, the cross members may be angled (lie at a non-zero angle) with respect to a radial direction. For example, a cross member may have two side surfaces which extend in a substantially axial direction between the front member and the rear member, and which are angled with respect to the radial direction. Thus, a centre line through a cross member (e.g. a line which is at an equal distance to the two side surfaces and/or which runs from a radially inward edge of the cross member through the centre of the cross member) may be angled with respect to the radial direction when viewed axially. Preferably each side surface is angled in the same direction and by a different amount. The direction in which the side surfaces are angled may be the direction of rotation of a fan inside the component.

The optimum angle of the cross members (e.g. the angle of the centre line to the radial direction) may vary in dependence on factors such as the size of the machine, the design of the fan and/or the speed of rotation. It has been found that in general it is desirable for the angle to be greater than 45°, 55°, 65° or 70° and/or less than 90°, 88° or 85° from the radial in the direction of rotation, although other values either greater than or less than any of these values may be used instead. Each of the cross members may lie at substantially the same angle, or different cross members may lie at different angles.

Where the component is arranged to house a fan, the cross members may have a centre line which is at an angle approximately equal to an angle at which airflow exits the fan. This may help to ensure that the cross members cause minimal blockage to the airflow.

Where the cross members have an axial cross section which is substantially triangular, the triangle may be obtuse (i.e. may have one interior angle of more than 90°). This may allow the cross member to lie at an appropriate angle to the direction of airflow.

Preferably gaps are provided between adjacent cross members in a circumferential direction. The gaps may provide a pathway for air to exit the component, and/or provide access to the interior of the component for assembly and servicing.

In one embodiment, the cross members are spaced evenly in a circumferential direction about the component. Thus, the gaps between adjacent cross members may be substantially the same. This may help to optimise the stiffness for a given amount of material. In another embodiment, the cross members may be spaced unevenly. Thus, the gaps between adjacent cross members may be of two or more different sizes. This can allow some of the gaps to be larger to allow access to the inside of the component for assembly and/or servicing, and may also facilitate different component designs such as "squared-off" designs.

In a preferred embodiment the cross members are arranged such that a gap between adjacent cross members increases with increasing distance from the inside of the component. This may provide an increase in the cross section of airflow through the component. This in turn may allow a progressive reduction in air velocity to be achieved within the component. This may help to convert part of the dynamic pressure into additional static pressure rise through steady expansion of the air flow cross-section. This in turn may help to improve the overall amount of cooling air passing through the machine for a given fan input power.

The optimum number of cross members may vary depending on, for example, the size and power rating of the machine. It general, it may be desirable for the component to have at least 4, 6 or 8 cross members and/or less than 20 or 18 cross members, or any number in between. However, a different number of cross members could be used where appropriate.

The front member and/or the rear member may be in the form of an annular disc (for example, bounded by two concentric circles). The front member may comprise a mating surface and/or a plurality of bolt holes for connecting the component to the prime mover and/or another component such as a separate adaptor. Alternatively or in addition, the front member may be arranged to support a bearing. The rear member may comprise a mating surface and/or a plurality of bolt holes for connecting the component to the generator.

In one embodiment of the invention, the component has a perimeter which is substantially cylindrical (i.e. the axial cross section approximates to a circle). A cylindrical shaped component may be efficient from a structural and cost perspective.

In another embodiment of the invention, at least one part of the component is squared off. Thus, the component may comprise at least one part with a planar perimeter and/or with a radius of curvature which is greater than the radius of the component. For example, the component may have a top, bottom and/or one or more sides which are substantially flat. This can allow the overall size of the component to be reduced. However, another part or parts of the perimeter may be curved (for example lying in a cylindrical surface).

The front member and/or the rear member may comprise at least one area with a reduced depth in a radial direction (in comparison to other areas). In this case, a gap between two adjacent cross members in a circumferential direction may be greater in an area in which the front and/or rear member has a reduced depth.

This may allow access to the inside of the component to be improved, thereby facilitating assembly and/or servicing.

The cross members may be located in one or more areas where the front and/or rear members do not have a reduced depth. This can allow the lengths of the cross members to be maximised, thereby maximising the contribution that the cross members make to the strength of the component, while at the same time facilitating access to the inside of the component. However, if desired, some cross members (if necessary, with a reduced radial length) could be provided in areas where the front and/or rear members have a reduced depth.

The component may further comprise at least one removable cover. For example, a plurality of removable covers may be provided, with one cover for each adjacent pair of cross members. Alternatively, one cover could span two or more cross members. Different types of cover may be used where different circumferential gaps are provided between adjacent cross members. The removable cover(s) may provide ingress protection and/or help prevent access to the inside of the component when it is in use.

In one embodiment of the invention, at least one removable cover comprises a wedge-shaped vane. The wedge-shaped vane may be provided in a location on the cover which corresponds to an area of the component which does not have a cross member. The wedge-shaped vane may have a shape which is the same as or similar to at least one of the cross members. Thus for example where there is a "missing" cross member in order to allow access to the inside of the component, the aerodynamic properties of the "missing" cross member can be re-introduced as part of the removable cover. This may allow the component to have an aerodynamic performance which is similar to one in which the cross member is not missing.

In any of the above arrangements, the component may comprise a peripheral wall. The peripheral wall may extend between the front member and a point part way or the whole way through the component in an axial direction. The peripheral wall may partially or fully close off one or more of the gaps between two adjacent cross members. The peripheral wall may help to increase mechanical stiffness, increase ingress protection and/or avoid the component interfering with other components.

In one embodiment, the peripheral wall is an angled wall. The angled wall may lie in a plane which is at a (non-zero) angle relative to an axial direction. In another embodiment the peripheral wall is a circumferential wall which extends circumferentially around part or all of the component. In this case, the wall may be cylindrical or partially cylindrical. In a further embodiment, the peripheral wall is a tapered wall. The tapered wall may extend circumferentially around part or all of the component. In this case, the wall may be frustoconical or partially frustoconical. The tapered wall may lie at a (non-zero) angle relative to an axial direction. If desired, a plurality of peripheral walls may be provided, each of which may be the same as or different from the others.

In one embodiment of the invention the component is an adaptor arranged to connect the electrical machine to the prime mover. In this case the front member may be arranged to connect the adaptor to the prime mover. This arrangement may be suitable where the generator is of a single bearing design.

The adaptor may be arranged to connect directly to the prime mover. For example, the adaptor may be arranged to connect to a non-rotating part of the prime mover such as a flywheel housing or other appropriate part of an engine housing. In this case the front member may comprise the appropriate connections, such as the appropriate SAE (Society of Automotive Engineers) connections, to match those of the flywheel housing.

Alternatively, the adaptor may be arranged to connect to the prime mover via an adaptor ring. The adaptor ring may be a ring which allows one set of connections (such as SAE connections) to be converted to another set of connections (such as other SAE connections). If desired, a plurality of different adaptor rings could be provided for use with different prime mover connections. This can allow the adaptor to connect to a number of different prime mover connections (such as SAE connections) using the appropriate adaptor ring, without the need to produce a separate adaptor for each case.

In one arrangement, the front member is arranged to connect to the adaptor ring. In this case, the front member may comprise the appropriate connections (such as bolt holes) for connecting the adaptor ring to the adaptor. The adaptor ring may comprise a first set of connections (such as bolt holes) for connecting the adaptor ring to the front member, and a second set of connections (such as bolt holes) for connecting the adaptor ring to a non-rotating part of the prime mover such as a flywheel housing.

In another arrangement, the front member itself may be the adaptor ring. In this case, the cross members may comprise the appropriate connections (such as bolt holes) for (removably) connecting the adaptor ring to the adaptor. The adaptor ring may comprise a first set of connections (such as bolt holes) for connecting the adaptor ring to the cross members, and a second set of connections (such as bolt holes) for connecting the adaptor ring to a non-rotating part of the prime mover such as a flywheel housing.

In another embodiment the component is a bracket arranged to support a bearing. In this case, the front member and/or the rear member may comprise means for supporting a bearing. For example, the front and/or rear member may be arranged to interface with a bearing or a bearing housing. This arrangement may be suitable for a two-bearing generator design.

The front member may also comprise the appropriate connections for connecting the bracket to an adaptor. The adaptor may be used to connect the bracket (and thus the generator) to a non-rotating part of the prime mover such as a flywheel housing.

As mentioned above, the rear member may be arranged to connect to the generator housing. Thus, the rear member may comprise the appropriate connections (such as bolt holes) for connecting the component to the generator housing. Alternatively, the generator housing and the component may be provided as a single part. Thus, the component may be integral with a generator housing.

According to another aspect of the invention there is provided a component for connection between a generator and a prime mover in a power generation system, the component comprising:
 a rear member;
 a front member; and
 a plurality of cross members which connect the front member to the rear member,
 wherein the cross members are angled with respect to a radial direction.

For example, a longitudinal direction of a cross member from a radially inward end to a radially outward end may be at a (non-zero) angle to the radial direction. Preferably, a centre line through a cross member (e.g. a notional line which runs from a radially inward edge of the cross member through the centre of the cross member and/or which is at an equal distance to two side surfaces) is at an angle to the radial direction when viewed axially. The angle of the cross members (e.g. the angle of the centre line to the radial direction) may be for example greater than 45°, 55°, 65° or 70° and/or less than 90°, 88° or 85° from the radial, although other values either greater than or less than any of these values may be used instead. Each of the cross members may lie at substantially the same angle, or different cross members may lie at different angles. Where the component is arranged to house a fan, the cross members may have a centre line which is at an angle approximately equal to an angle at which airflow exits the fan.

In this aspect of the invention, the cross members may be wedge-shaped, or they may have a cross section, when viewed axially, which is thinner towards an inward edge and towards an outer edge of the cross member, or they may have any other appropriate shape. Any of the other features described above with reference to the previous aspects of the invention may be provided with this aspect of the invention.

According to another aspect of the invention there is provided an assembly comprising a component in any of the forms described above, and a fan located inside the component. The fan may be arranged to produce a circulating air flow within the component which exits the component between the cross members. A cross member may have two (or more) side surfaces, each of which is angled in the direction of rotation of the fan (relative to the radial direction). The air flow may exit the component in a substantially tangential direction.

According to another aspect of the present invention there is provided a generator comprising a component or an assembly in any of the forms described above. According to a further aspect of the invention there is provided a generating set comprising a prime mover, a generator, and a component or assembly in any of the forms described above.

Corresponding methods may also be provided. Thus, according to another aspect of the invention there is provided a method of managing air flow in a rotating electrical machine, the method comprising using a fan to draw air through the machine and out through a component housing the fan, wherein the component comprises a plurality of wedge-shaped cross members and air flow passes between adjacent wedge-shaped cross members. Preferably the component comprises a front member and a rear member, and the plurality of cross members connect the front member to the rear member.

Features of one aspect of the invention may be provided with any other aspect. Apparatus features may be provided with method aspects and vice versa.

As used herein, terms such as "axially", "radially" and "circumferentially" are generally defined with reference to the axis of rotation of the electrical machine, unless the context dictates otherwise.

Preferred features of the present invention will now be described, purely by way of example, with reference to the accompanying drawings, in which.

Figure 1:
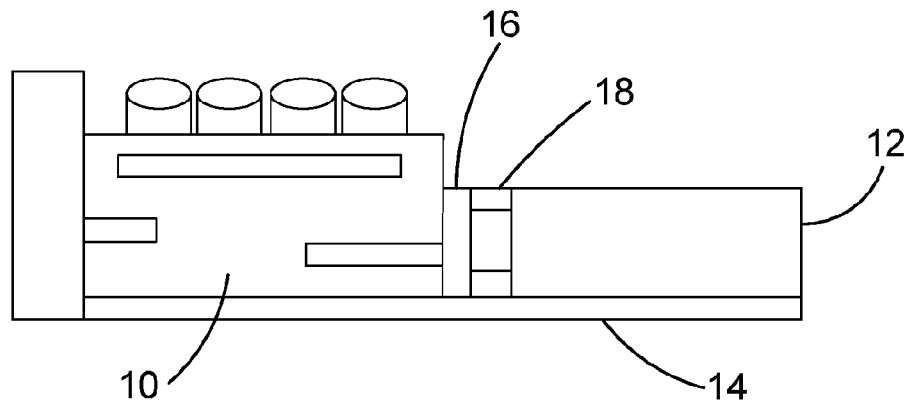
FIG. 1 shows schematically a generating set comprising an engine coupled to a generator.

FIG. 1 shows schematically a generating set comprising an engine 10 coupled to a generator (alternator) 12. The engine 10 is typically an internal combustion engine such as a petrol or diesel engine. The generator 12 may be any type of electrical generator, such as a synchronous generator or a permanent magnet generator. The engine 10 and generator 12 are both mounted on a bed frame 14. Rubber mounts may be provided between the engine and the bed frame, and between the generator and the bed frame. The crankshaft of the engine is mechanically coupled to the rotor of the generator. In operation, mechanical energy produced by the engine 10 is transferred to the generator 12 in order to generate the electrical output.

In the arrangement of FIG. 1 the engine 10 comprises a flywheel located in a fly wheel housing 16. An adaptor 18 is used to connect the engine 10 to the generator 12. In FIG. 1 the adaptor is shown attached to the flywheel housing 16, although the adaptor may be attached to another part of the engine if desired. The adaptor 18 provides structural attachment between the generator housing and the engine, and thus helps to prevent relative movement between the engine and the generator. A shaft passes through the adaptor in order to connect the rotating parts of the engine and generator. A fan may be mounted on the shaft inside the adaptor, in order to draw cooling air though the generator.

Figure 2:
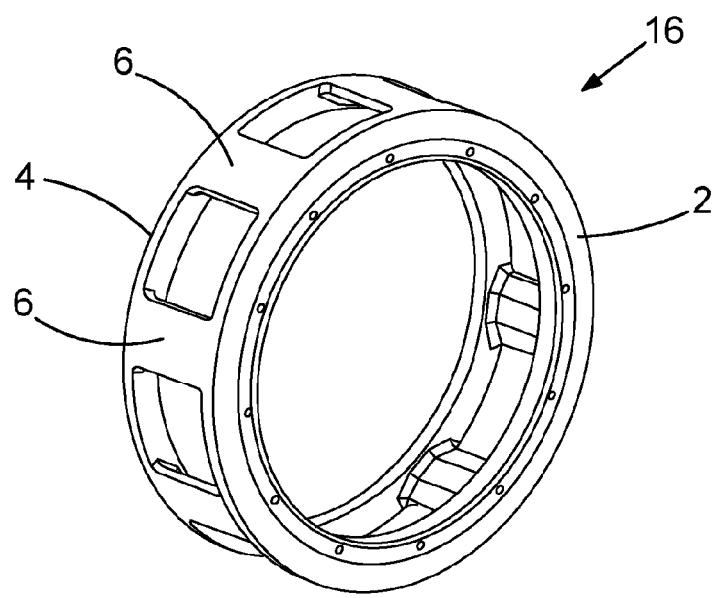
FIG. 2 shows a previously considered adaptor.

FIG. 2 shows a previously considered adaptor for connecting a generator to an engine. The adaptor is arranged to convert one set of connections on the generator housing (frame) to another set of connections on the flywheel housing. Referring to FIG. 2, the adaptor 16 comprises a front (drive end) member 2, a rear (non-drive end) member 4, and a plurality of cross members 6. The front member 2 is arranged to connect the adaptor to a flywheel housing, while the rear member 4 is arranged to connect the adaptor to the generator frame. The plurality of cross members 6 provide the physical connections between the front member 2 and the rear member 4. The cross members 6 are spaced around the periphery of the adaptor, and run in an axial direction between the front member 2 and the rear member 4. The adaptor 16 is arranged to surround a fan which is located on a shaft connecting the engine to the generator.

The adaptor shown in FIG. 2 is substantially cylindrical in shape. The cross members 6 are designed for physical strength, to ensure the physical rigidity of the adaptor. In axial cross section, the cross members 6 have a regular convex polygon shape, with parallel sides on the inside and outside. The outer surfaces of the cross members lie in the (notional) cylindrical outer surface of the adaptor.

The cylindrical shaped adaptor of FIG. 2 is efficient from a structural, space and cost perspective. However, it has been found that air-flow and thermal performance may be limited. In particular, the cross members may partially block airflow from the fan, creating a wake accompanied by flow separation and turbulence.

Figure 3:
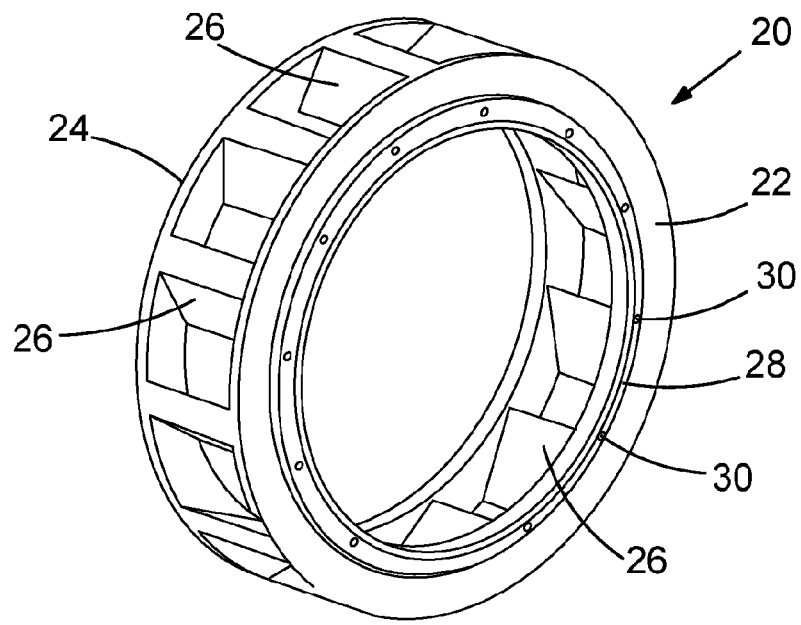
FIG. 3 shows an adaptor in an embodiment of the invention.

FIG. 3 shows an adaptor in one embodiment of the present invention. Referring to FIG. 3, the adaptor 20 comprises a front (drive end) member 22, a rear (non-drive end) member 24, and a plurality of cross members 26. The front member 22 is arranged to connect the adaptor to a flywheel housing, while the rear member 24 is arranged to connect the adaptor to the generator frame. The plurality of cross members 26 provide the physical connections between the front member 22 and the rear member 24, that is, the cross members connect the front and rear members and space them apart axially, and function to ensure the physical rigidity of the adaptor. The adaptor 20 is arranged to surround a fan which is located on a shaft connecting the engine to the generator.

The front member 22 is in the form of an annular disc (a ring-shaped disc). A raised mating surface 28 on the front member interfaces with a corresponding surface on the flywheel housing. The mating surface 28 has a plurality of bolt holes 30 for connecting the adaptor to the flywheel housing. The number and location of the bolt holes 30 may be governed by standard requirements, such as SAE (Society of Automotive Engineers) standards. The rear member 24 is also in the form of an annular disc, and also comprises a mating surface and a plurality of bolt holes for connecting the adaptor to the generator housing. The frame connection is not usually an SAE standard connection. However, if desired, the number and location of the bolt holes in the rear member 24 could also be governed by standard requirements, such as SAE standards, which may be different from or the same as those of the bolt holes 30 in the front member 22.

In the arrangement of FIG. 3, the cross members 26 are in the form of a series of wedge-shaped vanes between the front member 22 and the rear member 24. The vanes are spaced circumferentially about the adaptor, around the outside of the fan. The vanes are designed to maximise air-flow whilst retaining the inherent structural benefits of a "round" adaptor.

Figure 4:
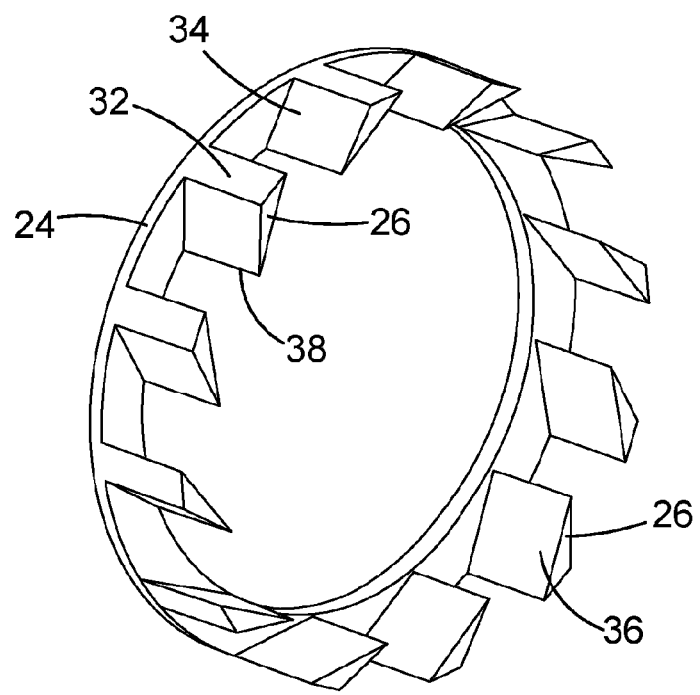
FIG. 4 shows a view of the adaptor of FIG. 3 with part of the adaptor removed.

FIG. 4 shows a view of the adaptor 20 with the front member removed, in order to show the cross members 26 more clearly. In this embodiment the cross members are evenly spaced around the adaptor, such that the gaps between any two adjacent cross members are substantially the same.

Figure 5:
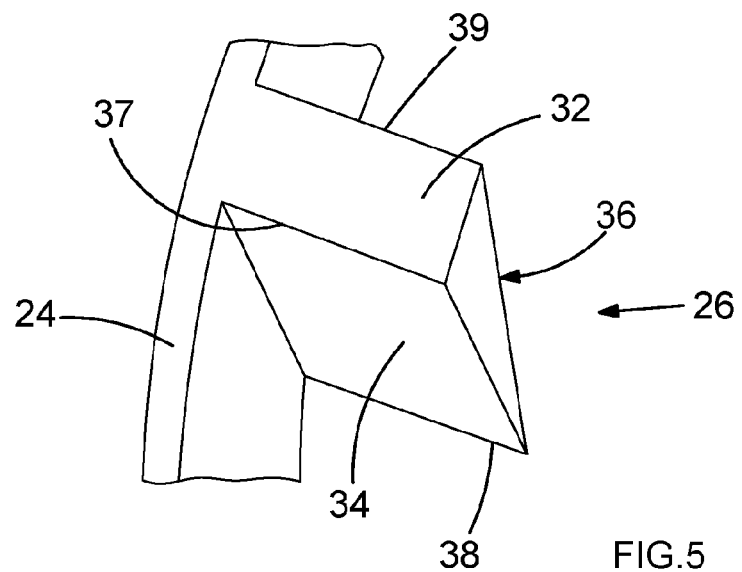
FIG. 5 shows part of the adaptor of FIGS. 3 and 4 in more detail.

FIG. 5 shows one of the cross-members 26 in more detail. Referring to FIGS. 3 to 5, each cross member 26 is wedge-shaped, with an outer surface 32 and two side surfaces 34, 36. The two side surfaces 34, 36 are inclined towards each other and meet together at an edge 38 on the radially inwards side of the adaptor. The outer surface 32 extends between the radially outwards ends of the two side surfaces 34, 36, and meets those surfaces at respective edges 37, 39. The first side surface 34 and the second side surface 36 are both inclined with respect to a radial direction from the centre of the adaptor.

In this embodiment, the outer surface 32 is a curved surface which extends in an axial direction between the front member 22 and the rear member 24, and in a circumferential direction between the radially outwards ends of the two side surfaces 34, 36. When viewed in axial cross section, the outer surface 32 forms a curved arc with a radius of curvature centred on the axis of rotation of the machine. Each side surface 34, 36 is a planar surface which extends in an axial direction between the front member 22 and the rear member 24, and in a direction which is at an angle to the radial direction between the inside edge 38 and the outer surface 32. While in this embodiment the two side surfaces 34, 36 are planar and the outer surface 32 is curved, other configurations are also possible, and each of the outer surface 32 and the two side surfaces 34, 36 may be curved or planar, or may comprise a succession of planar surfaces.

Figure 6:
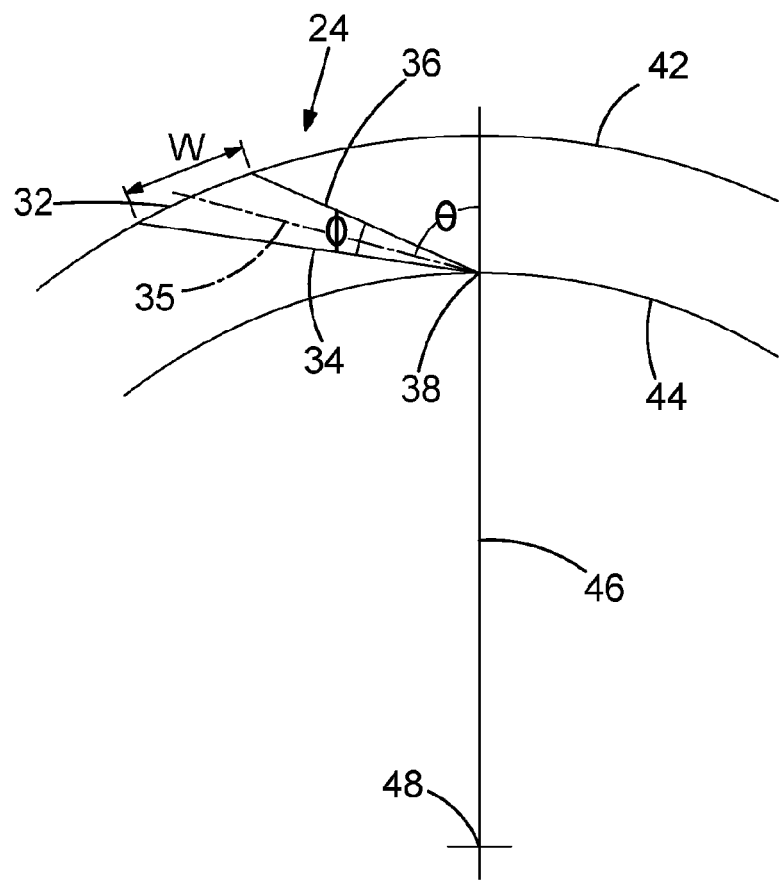
FIG. 6 shows a cross section through a cross member.

FIG. 6 shows a cross section through one of the cross members 26. Referring to FIG. 6, the outer surface 32 lies in the perimeter 42 of the adaptor. The two side surfaces 34, 36 are inclined relative to each other at an angle $\varphi$ and meet together at the edge 38 on the radially inwards side 44 of the adaptor. The two side surfaces 34, 36 extend outwards from the edge 38 to the outer surface 32.

The width W of the outer surface 32 is less than the lengths of the two side surfaces 34, 36 (i.e. the lengths between the edge 38 and the outer surface 32). The length of the first side surface 34 is greater than that of the second side surface 36.

The cross member 24 has a notional centre line 35 which runs from the edge 38 through the cross member at an equal distance to the two side surfaces 34, 36. The centre line 35 is at an angle $\theta$ to a line 46 extending radially outwards from the centre 48 of the adaptor (i.e. the axis of rotation of the shaft). Each of the side surfaces 34, 36 is at an angle to the line 46, which angle is greater than zero and less than 90°. The internal angle between the outer surface 32 and the second surface 36 is greater than 90° (i.e. the triangle is obtuse). The edge 38 may be slightly rounded off, for example with a radius of curvature of around 2-5 mm, although other arrangements are possible.

Figure 7A:
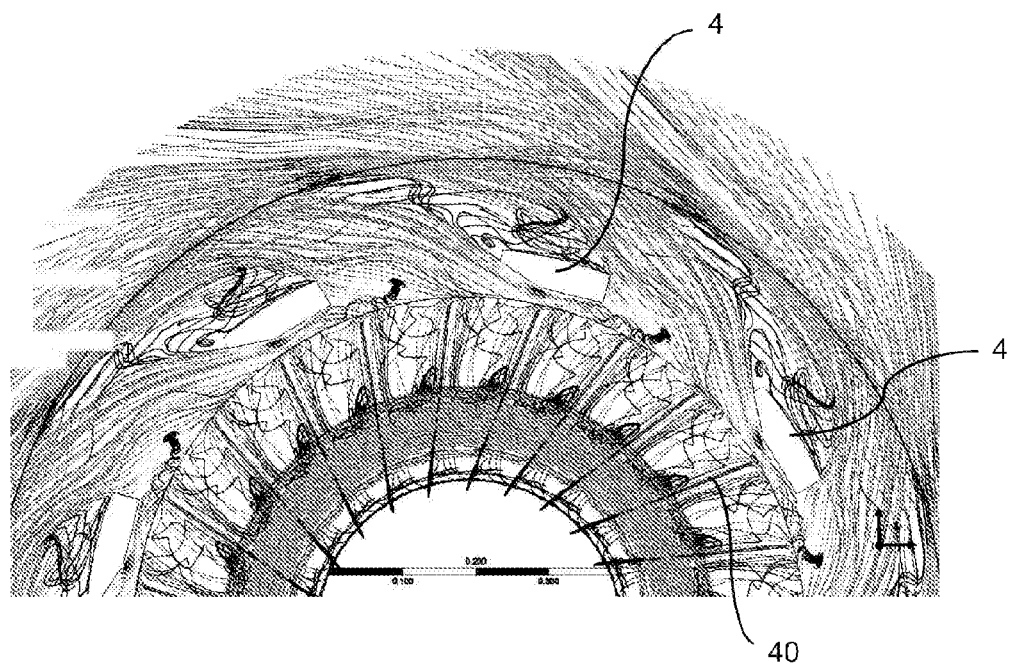
FIGS. 7A and 7B show example air flow patterns through adaptors with different designs.
Figure 7B:
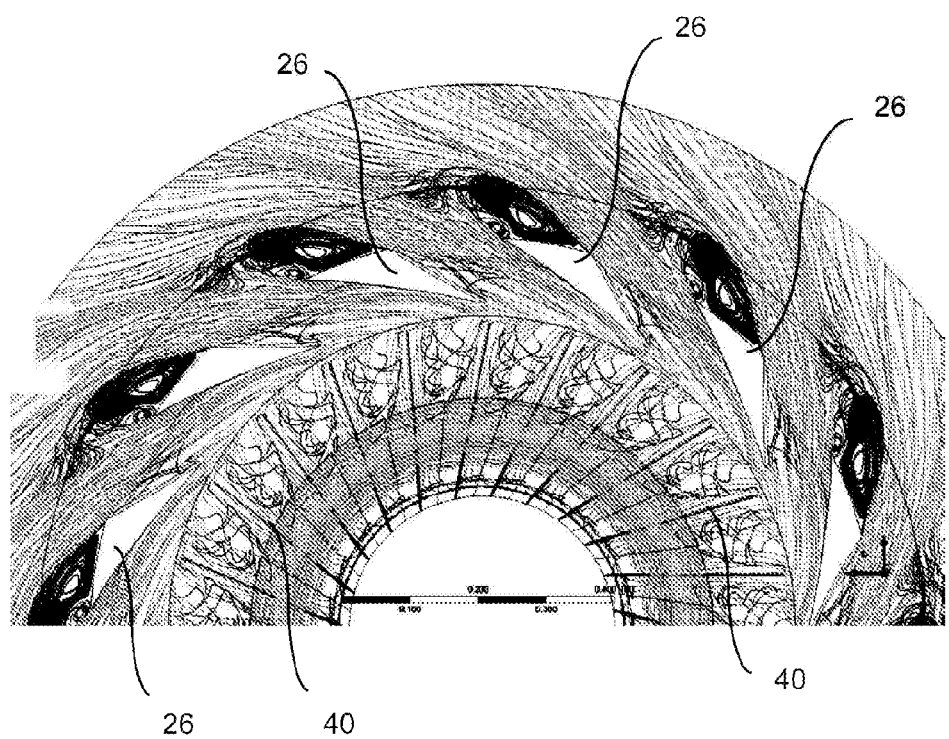

FIGS. 7A and 7B show example air flow patterns through adaptors with different designs. Air flow patterns through a previously considered adaptor design are shown in FIG. 7A. Referring to FIG. 7A, the adaptor comprises a plurality of cross members 4 with a flat inside surface and a chamfer on the trailing edge. The adaptor surrounds a fan comprising fan blades 40. In the arrangement shown, the fan rotates in an anticlockwise direction to produce an airflow which exits the fan at an angle which is close to tangential. It can be seen from FIG. 7A that the cross members create wake blockage. This leads to turbulence, which reduces the rate of airflow through the adaptor.

FIG. 7B shows example air flow patterns through an adaptor using the design of FIGS. 3 to 6. Referring to FIG. 7B, the adaptor comprises a plurality of wedge-shaped cross members 26 in the form described above with reference to FIGS. 3 to 6. The total number of cross members is increased in comparison to the arrangement of FIG. 7A, to maintain the strength of the adaptor. The adaptor surrounds a fan comprising fan blades 40 which rotate in an anticlockwise direction.

It can be seen from FIG. 7B that the wedge-shaped cross members allow the airflow exiting the fan to pass between them with minimal disturbance. Although wakes are formed, these are smaller than with the previously considered design. Thus the wedge-shaped cross member can result in lower wake blockage, and as a consequence smoother airflow with less turbulence. This is turn can help to maximise airflow through the machine, thereby increasing the amount of cooling for a given fan power.

The selection of values of parameters such as the angle $\theta$, the width W and the total number of cross members is a compromise between strength, aerodynamics, and physical constraints. Generally, the angle $\theta$ is selected to be approximately the same as the angle at which airflow exits the fan. The width W and the total number of cross members are selected to ensure sufficient physical strength, while minimising any obstruction to the air flow. A suitable value of the angle $\theta$ has been found to be greater than 45° and/or less than 90°, for example between 70° and 85°. In some particular implementations suitable values have been found to be 73° or 82°, although of course the actual value may be varied to suit the circumstances. The angle $\varphi$ between the two side surfaces 34, 36 may be, for example, greater than 10° and less than 30°, although other values may be used instead.

The wedge shaped cross member design is advantageous in that it presents a narrow edge 38 to the airflow, while having a width W at the outer circumference which ensures sufficient strength and rigidity.

By increasing the total number of cross members (relative to previous designs), it may be possible to reduce the value of the width W. This may provide the advantage that the distance between adjacent cross members increases with increasing distance outwards through the adaptor. This can provide a progressive reduction in air velocity with minimal turbulence and energy loss, and hence convert part of the dynamic pressure into additional static pressure rise through steady expansion of the air flow cross-section.

The adaptor shown in FIGS. 3 to 6 is substantially cylindrical. The cylindrical adaptor shape is efficient from a structural, space and cost perspective. The wedge-shaped vanes provide a more aerodynamic shape which help to maximise air-flow whilst retaining the inherent structural benefits of a "round" adaptor.

Figure 8:
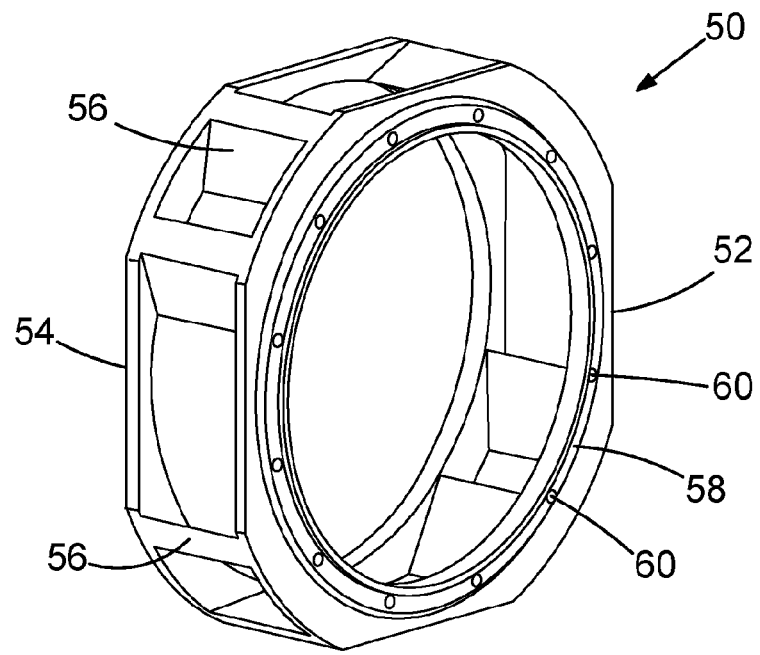
FIG. 8 shows an adaptor in another embodiment of the invention.

FIG. 8 shows an adaptor in another embodiment of the present invention. The adaptor of FIG. 8 has a "squared-off" design, which may allow the overall size to be reduced, and may improve access for serviceability.

Referring to FIG. 8, the adaptor 50 comprises a front member 52, a rear member 54, and a plurality of cross members 56. The front member 52 is arranged to connect the adaptor to a flywheel housing, while the rear member 54 is arranged to connect the adaptor to the generator frame. The plurality of cross members 56 provide the physical connections between the front member 52 and the rear member 54, and thus function to ensure the physical rigidity of the adaptor. The front member 52 has a mating surface 58 with a plurality of bolt holes 60 for connecting the adaptor to the flywheel housing. The rear member 54 also has a mating surface and a plurality of bolt holes for connecting the adaptor to the generator housing.

The cross members 56 are in the form of wedge-shaped vanes. Each cross member 56 comprises an outer surface and two side surfaces which are inclined towards each other and meet together at an edge on the radially inwards side of the adaptor, similar to the embodiment described above with reference to FIGS. 3 to 7. The adaptor 50 is arranged to house a fan, with the cross members 56 situated at spaced locations around the outside of the fan. The wedge-shaped cross members can result in lower wake blockage, which can help to maximise airflow through the machine.

Figure 9:
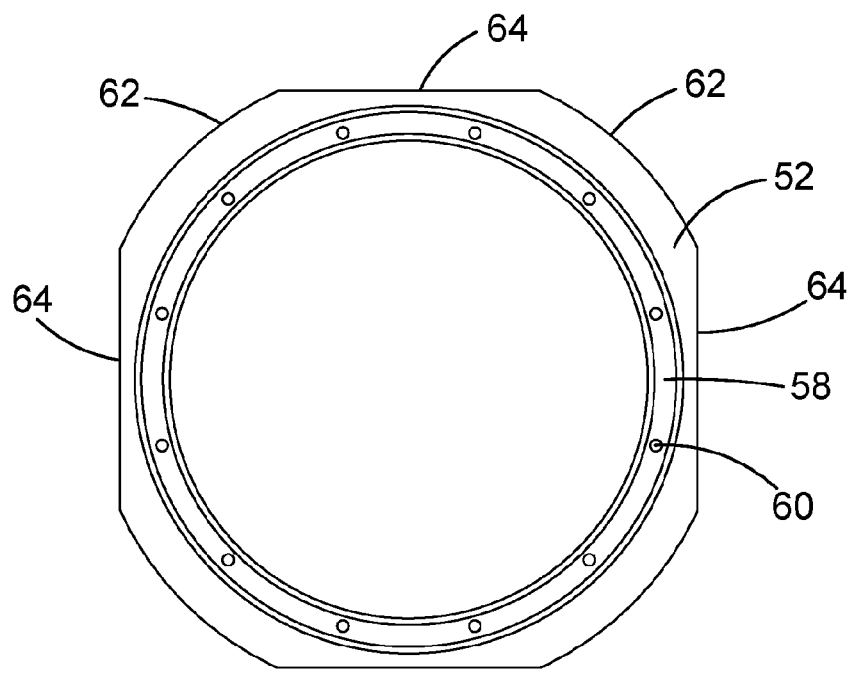
FIG. 9 shows an end view of the adaptor of FIG. 8.

FIG. 9 shows an end view of the adaptor of FIG. 8. Referring to FIGS. 8 and 9, in this embodiment the front member 52 and the rear member 54 are squared-off at the top, bottom and sides. Thus, the adaptor has first areas 62 in which the perimeter lies in a curved surface (in this case cylindrical) and second areas 64 in which the perimeter lies in a planar surface. The thickness of the connecting members in a radial direction is reduced at the top, bottom and sides. Thus, the thickness of the connecting members is greater in the first areas 62 than in the second areas 64.

By reducing the thickness of the adaptor at the top, bottom and sides, the overall size of the adaptor can be reduced. This may be desirable in applications where space is limited.

Figure 10:
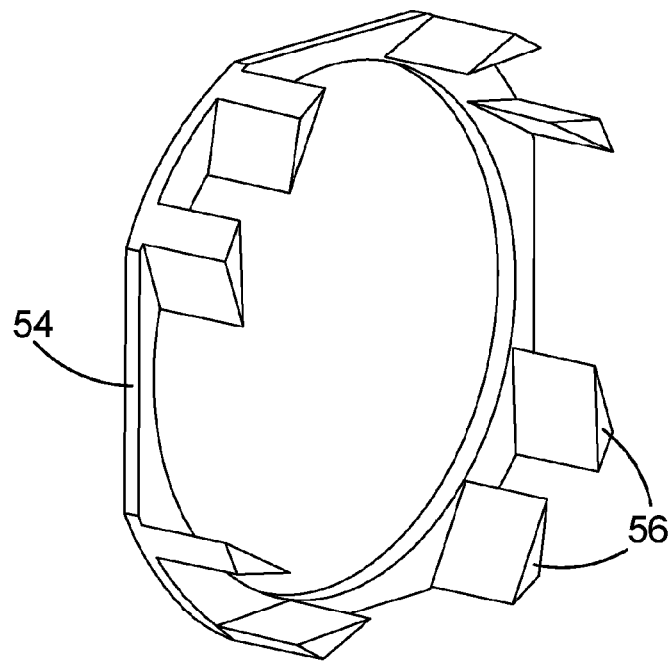
FIG. 10 shows the adaptor of FIG. 8 with part of the adaptor removed.
Figure 11:
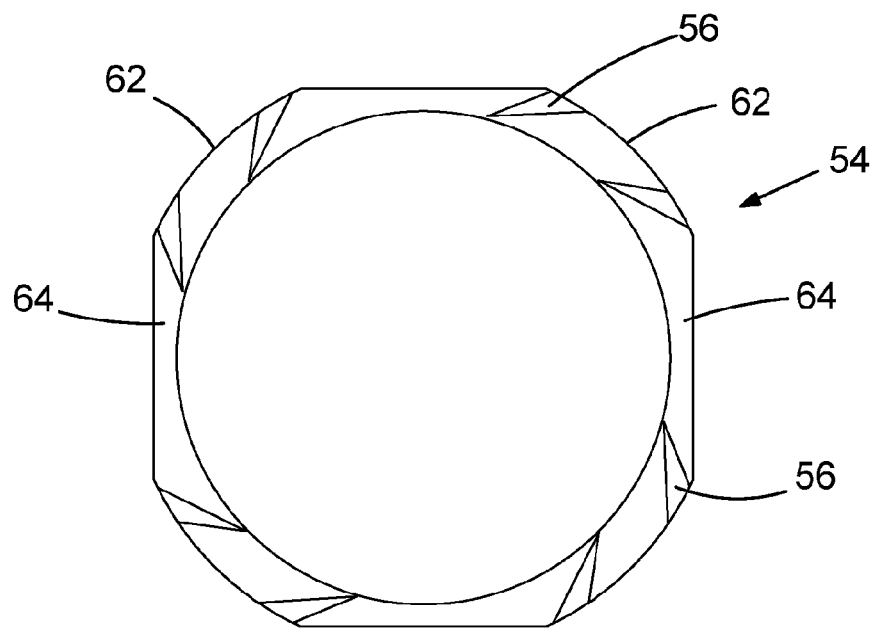
FIG. 11 is a view of an inside surface of the adaptor.

FIG. 10 shows the adaptor of FIG. 8 with the front member removed. FIG. 11 is a view of the inside surface of the rear member, showing the locations of the cross members. Referring to FIGS. 10 and 11, in this arrangement the cross members 56 are located in the first areas 62 where the connecting members have a greater radial thickness. Thus, the cross members are located in areas in which their lengths can be maximised in a radial direction, thereby maximising the contribution that the cross members make to the strength of the adaptor.

In the arrangement shown in FIGS. 8 to 11, some cross members are "missing" from the areas where the adaptor is squared off. Thus the gaps between the cross members in a circumferential direction is greater where the adaptor is squared off than in other areas. This can allow access to the inside of the adaptor to be improved, which can facilitate assembly and/or servicing of the generating set.

Although FIGS. 8 to 11 show an adaptor which is squared off at the top, bottom and both sides, it would also be possible to square off one or some of the top, bottom and sides, rather than all of them. The location(s) at which the adaptor is squared off may be varied to suit the physical constraints of the particular application. Although the perimeter is shown as being planar in the second areas 64, it would also be possible for it to take some other shape, such as having a certain degree of curvature, if desired. Furthermore, although not shown in FIGS. 8 to 11, it would also be possible to have cross members with a reduced radial length in some or all of the squared-off locations.

In the arrangement of FIGS. 8 to 11, if the "missing" cross members have a negative impact on aerodynamic performance, then it would be possible to re-introduce them as features attached to ingress protection covers.

Figure 12:
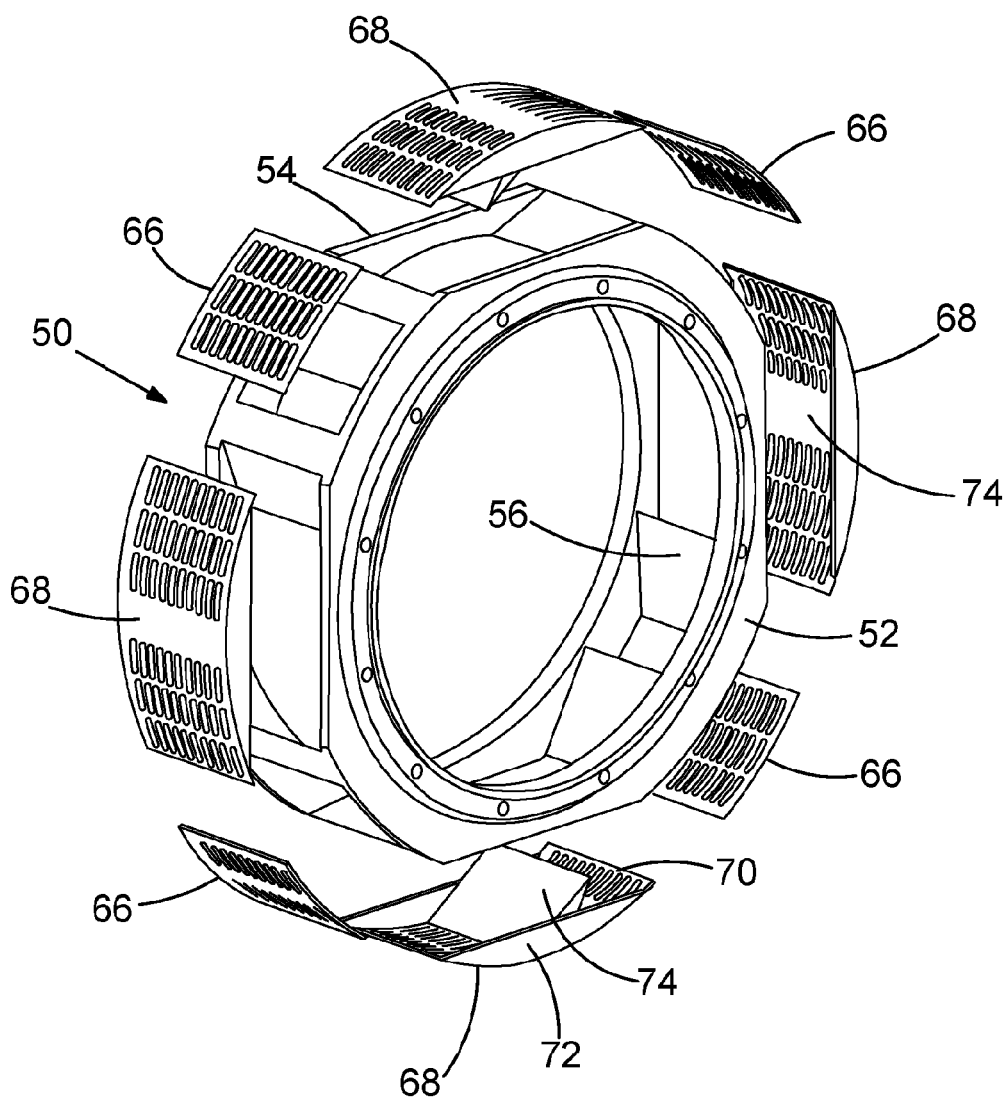
FIG. 12 illustrates how removable covers may be added to the adaptor of FIGS. 8 to 11.

FIG. 12 illustrates how removable covers may be added to the adaptor of FIGS. 8 to 11. Referring to FIG. 12, a plurality of covers is designed to fit around the outside of the adaptor. In the arrangement shown, a separate cover is provided for each adjacent pair of cross members. Alternatively, each cover could span more than two cross members. The removable covers may be press fitted into the adaptor and/or attached in any other way, such using bolts, snap-on or "click together" features, or (for non-removable covers) using adhesive or rivets etc.

In the arrangement of FIG. 12, two different types of cover are used. A first type of cover 66 is designed to fit between two adjacent cross members 56 in the non-squared off parts of the adaptor. A second type of cover 68 is designed to fit between two adjacent cross members 56 in the squared off parts of the adaptor.

Figure 13:
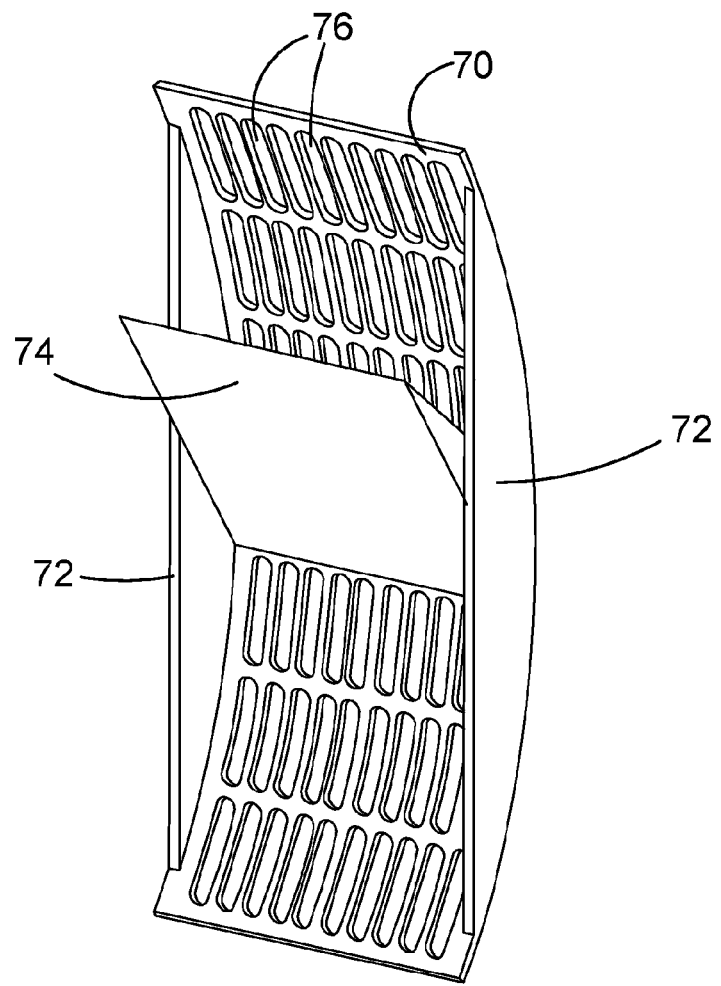
FIG. 13 shows a cover in more detail.

FIG. 13 shows the second type of cover 68 in more detail. Referring to FIGS. 12 and 13, the cover 68 comprises a curved outer surface 70, side members 72, and a wedge-shaped vane 74. The curved surface 70 has a plurality of holes 76, which allow air to exit the adaptor while providing ingress protection. The number, size and shape of the holes 76 may be varied to suit the circumstances. The side members 72 act to replace the "missing" parts of the connecting members. The vane 74 is similar in form to the wedge-shaped cross members described above. This can allow the squared off adaptor to have a similar aerodynamic performance to a cylindrical adaptor, while allowing access to the inside of the adaptor for assembly and servicing via a removable cover.

Figure 14:
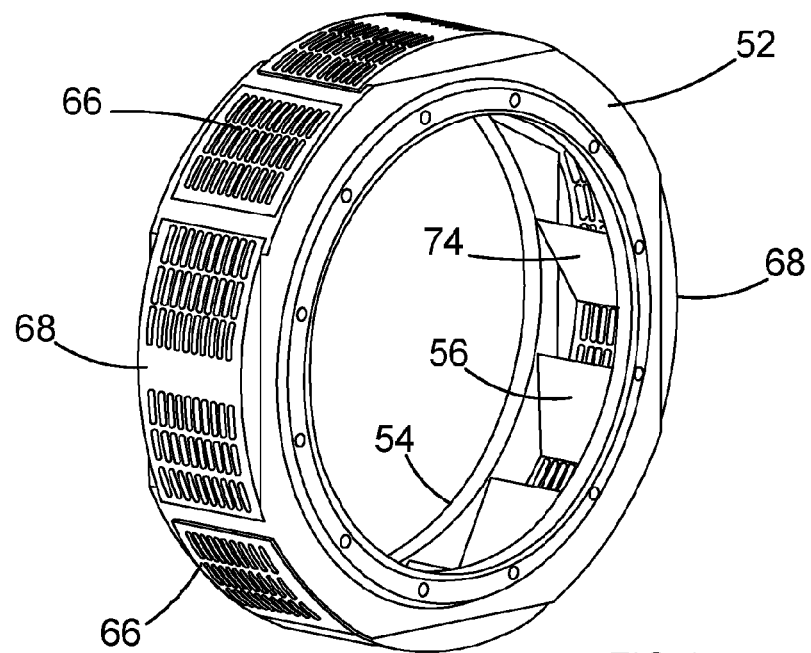
FIGS. 14 and 15 show views of an adaptor with covers in place.
Figure 15:
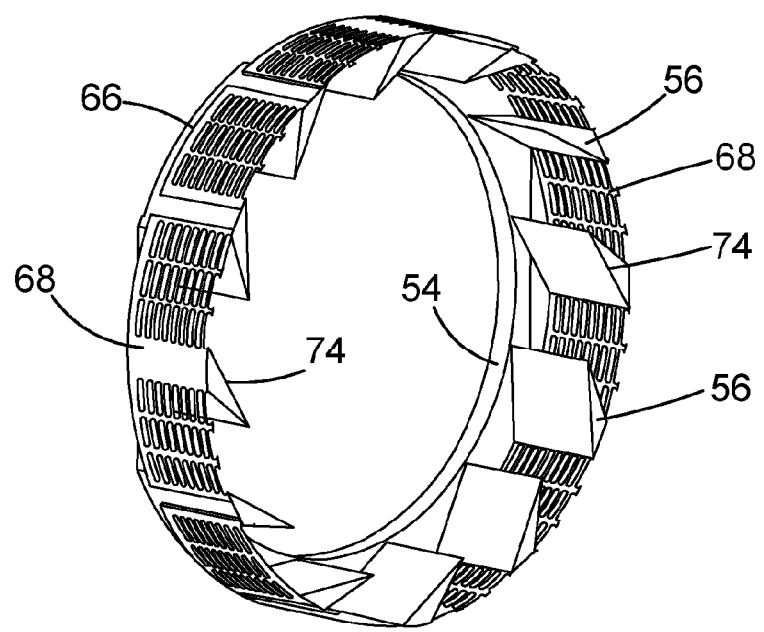

FIG. 14 shows a view of the adaptor with the covers 66, 68 in place. FIG. 15 shows the adaptor with the covers 66, 68 in place and the front member removed, in order to show the cross members 56 and vanes 74 more clearly. Referring to FIGS. 14 and 15, it can be seen that, by using the wedge-shaped vanes 74 to replace the "missing" cross members, the wedge-shaped cross members/vanes may be equally spaced around the adaptor circumferentially. This may help to ensure a consistent aerodynamic performance.

The removable covers shown in FIGS. 12 to 15 can be modified to suit different ingress protection ratings. This can provide the flexibility to cater for different customer requirements and operating environments. Various different removable covers can be manufactured to provide various degrees of ingress protection, without the need to manufacture a different adaptor for each situation.

Another advantage of the removable covers is that they can be removed during assembly to gain hand access to coupling disc fasteners. In addition, access can be provided to the flywheel housing fasteners (which locate through the adaptor). This can facilitate assembly of the generator set. However, when the covers are in place they prevent the operator from gaining access to moving parts without a tool, thereby complying with operating regulations.

In addition, the removable covers can be used to adjust the air flow pattern thus enhancing the thermal performance. The removable covers may also include various different filtration components which may be adapted to suit different customer requirements and operating environments.

Removable covers of the type described above may also be used with a cylindrical adaptor design such as that of FIGS. 3 to 6. Furthermore, the cylindrical adaptor design may also have one or more "missing" cross members, in order to improve access. In this case, one or more of the covers may include a wedge-shaped vane to compensate.

The adaptor designs described above are suitable for use with single bearing generator designs, in which one end of the generator shaft is supported by bearings in the engine. Other types of generating set may use a two-bearing design. In this case a bracket may be provided which connects to the generator frame and which supports a bearing.

Figure 16:
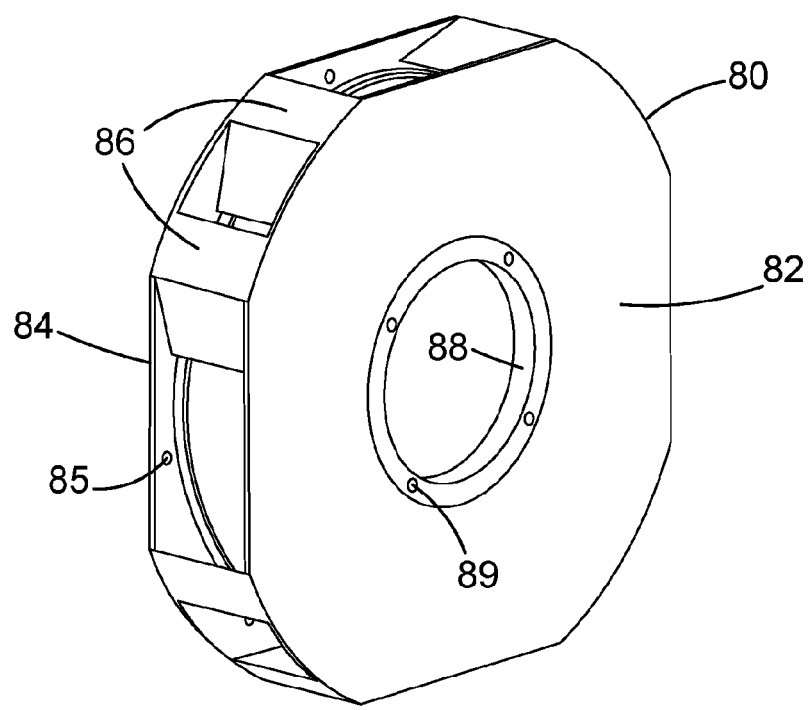
FIG. 16 shows parts of a bracket in another embodiment of the invention.

FIG. 16 shows parts of a bracket in another embodiment of the invention. Referring to FIG. 16, the bracket 80 comprises a front (drive end) member 82, a rear (non-drive end) member 84, and a plurality of cross members 86. The rear member 84 comprises a plurality of bolt holes 85 for connecting the bracket to the generator frame. The plurality of cross members 86 provide the physical connections between the front member 82 and the rear member 84. The cross members 86 are in the form of wedge-shaped vanes, as in the adaptor designs described above. The bracket 80 is arranged to house a fan, in a similar way to the adaptors described above.

In the arrangement of FIG. 16, the bracket has a square shaped design, similar to the adaptor of FIGS. 12 to 15. However, in the bracket of FIG. 16, the front member 82 is extended radially inwards. A bearing support 88 is provided at the centre of the front member 82, which is used to support a bearing housing. The bearing support 88 comprises a plurality of bolt holes 89 for bolting the bearing housing to the bracket. This can allow the bracket to be used with a two-bearing generator, in which one end of the generator shaft is supported by bearings held by the bracket rather than using engine bearings.

Normally, in a two-bearing design, the two-bearing bracket does not connect directly to the flywheel housing. Thus, in the arrangement shown in FIG. 16, the front member 82 is not designed to connect to a flywheel housing.

Some two-bearing machines do not have the alternator frame connected with the engine housing at all, and rely on a rigid connection between the alternator to bed frame, and the engine to bed frame. If it is desired to connect a two-bearing machine to the flywheel housing, a separate adaptor may be fitted between the bracket and the flywheel housing. In this case, the adaptor may be attached to the front member 82. Alternatively, the bracket and adaptor may be provided as a single component.

Figure 17:
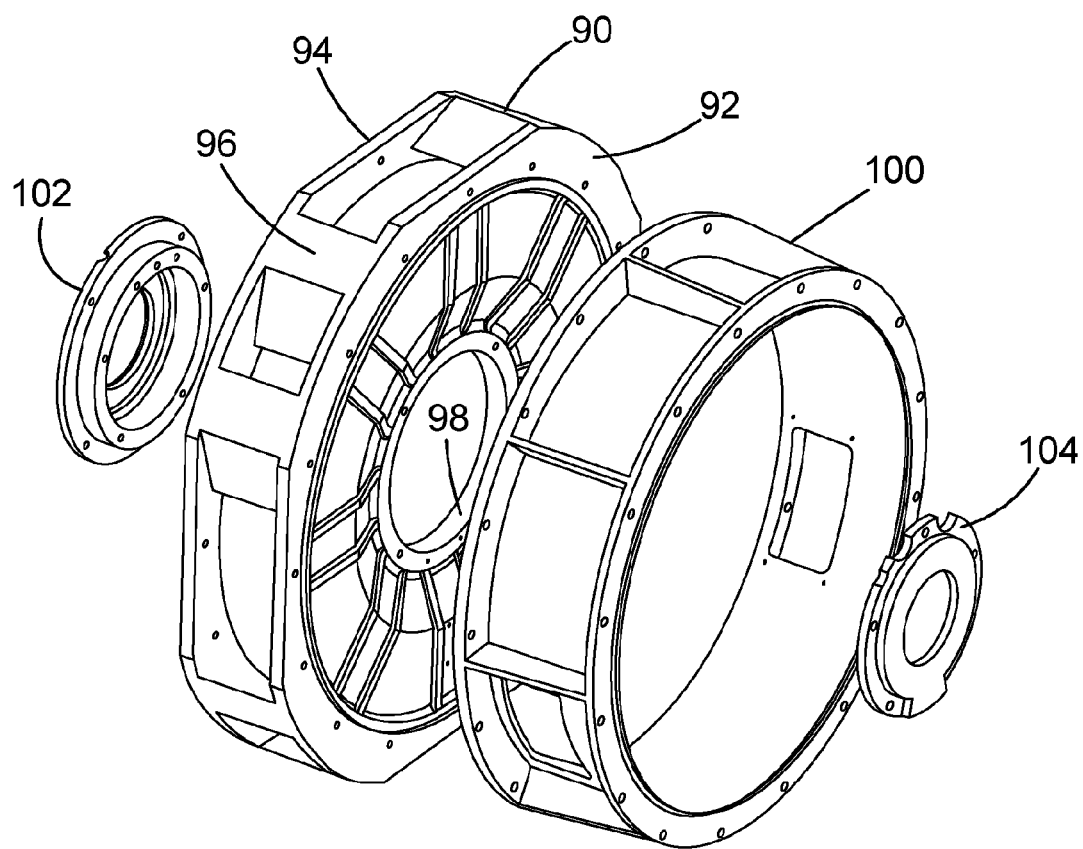
FIG. 17 shows parts of a bracket and adaptor assembly in another embodiment of the invention.

FIG. 17 shows parts of a bracket and adaptor assembly in another embodiment of the invention. Referring to FIG. 17, the assembly comprises drive end bracket 90, adaptor 100, bearing cartridge 102, and bearing cap 104. The bracket 90 is arranged to connect on one side to the generator frame and on the other side to the adaptor 100. The adaptor is arranged to connect the bracket to the flywheel housing.

In the arrangement of FIG. 17 the bracket 90 is arranged to support a bearing, as well as to house a fan. The bracket 90 comprises a front member 92, a rear member 94, and a plurality of cross members 96. The rear member 94 is arranged to connect the bracket to the generator frame. The front member 92 is arranged to connect to the adaptor 100. The cross members 96 provide the physical connections between the front member 92 and the rear member 94. The cross members 96 are in the form of wedge-shaped vanes, as described above with reference to FIGS. 3 to 16. A bearing support 98 is provided at the centre of the front member 92, which is used to support the bearing cartridge 102 and the bearing cap 104. Alternatively, the bearing could sit directly within the bracket.

The arrangement shown in FIG. 17 can allow the bracket to be used with a two-bearing generator, in which one end of the generator shaft is supported by bearings held by the bracket rather than using engine bearings. The adaptor 100 is used to connect the bracket to the flywheel housing, to provide a rigid connection between the generator and the engine.

The two-bearing bracket may use any of the designs described above with reference to FIGS. 3 to 16.

In any of the above embodiments, the adaptor and/or bracket may be formed from a single cast piece of metal and/or may be machined to the required design. Alternatively or in addition any other suitable manufacturing method may be used, such as fabrication, or using separate components which bolt or fix together.

Figure 18A:
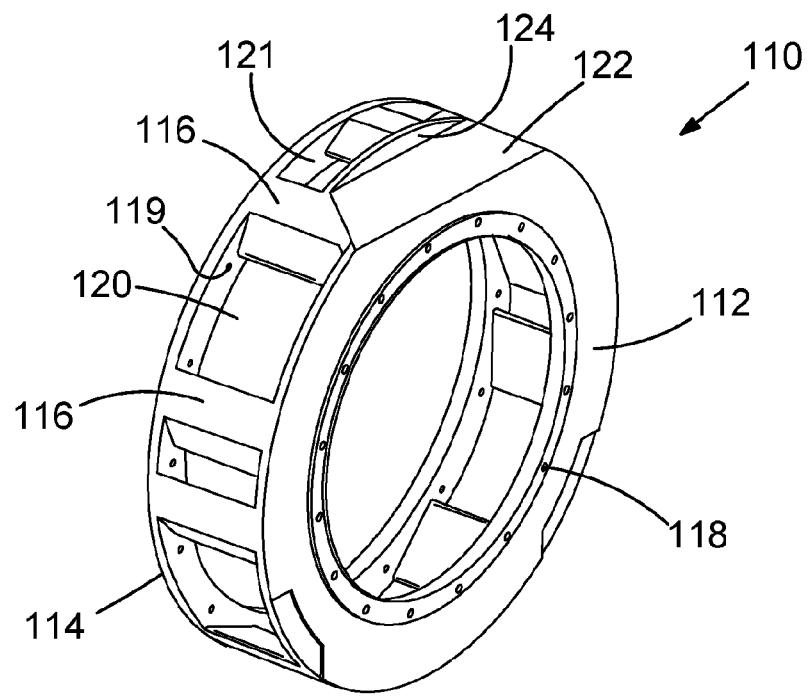
FIG. 18A is a perspective view of an adaptor in another embodiment.
Figure 18B:
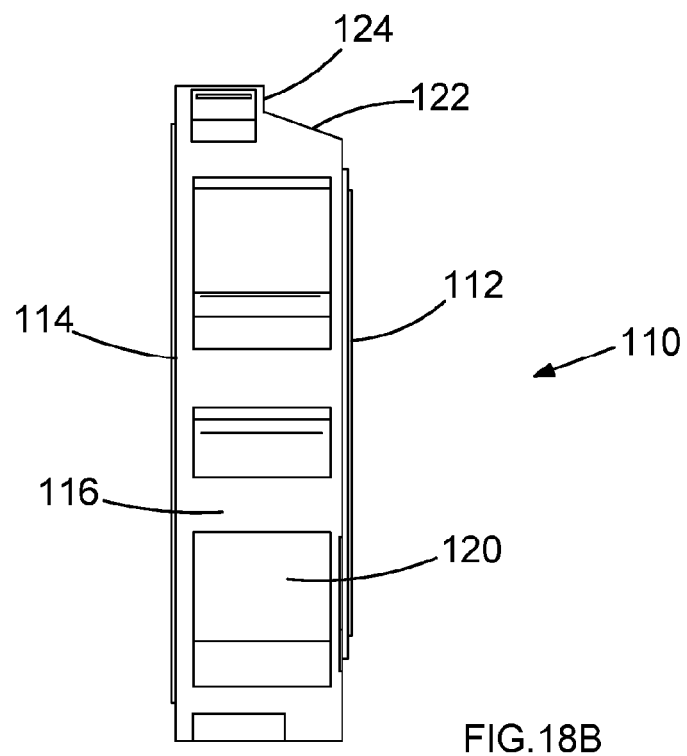
FIG. 18B is a side view of the adaptor of FIG. 18A.

FIG. 18A is a perspective view of an adaptor in another embodiment. A side view of the adaptor of FIG. 18A is shown in FIG. 18B. Referring to FIGS. 18A and 18B, the adaptor 110 comprises a front member 112, a rear member 114, and a plurality of cross members 116. As in the previous embodiments, the front member 112 is arranged to connect the adaptor to a flywheel housing, the rear member 114 is arranged to connect the adaptor to the generator frame, and the cross members 116 provide the physical connections between the front and rear members. Bolt holes 118 are provided for connecting the front member 112 to a flywheel housing, and bolt holes 119 are provided for connecting the rear member 114 to a generator frame. The cross members 116 are in the form of wedge-shaped vanes between the front member 112 and the rear member 114, similar to the embodiments described above. The adaptor 110 is arranged to house a fan, with the cross members 116 situated at spaced locations around the outside of the fan. The wedge-shaped cross members 116 can result in lower wake blockage than previous designs, which can help to maximise airflow through the machine.

The adaptor of FIGS. 18A and 18B has a circular design, similar to that of FIG. 3, which may provide advantages from a structural, space and cost perspective. However, in the adaptor of FIGS. 18A and 18B, the vanes are unevenly spaced about the adaptor, so that some adjacent pairs of cross members have gaps between them which are larger than those of other adjacent pairs of cross members. The larger gaps form windows 120 through which a user can access the inside of the adaptor during assembly and servicing.

In the arrangement of FIGS. 18A and 18B, the adaptor 110 also includes a peripheral wall 122. In this example the peripheral wall is an angled upper wall which extends from the front member 112 to a point part-way through the adaptor 110 in an axial direction. A step 124 is provided at the mid-way point to connect the wall 122 to the outer periphery of the adaptor. The angled upper wall partially closes the top two air outlets 121. The wall 122 is angled with respect to the axial direction, in this case at an angle of approximately 20°, although other values may be used instead. The angled wall presents a face which is recessed with respect to corresponding parts of the adaptor at other locations circumferentially about the adaptor. The angled wall 122 may help to increase mechanical stiffness, increase ingress protection and/or avoid the adaptor interfering with other components of the generator set.

Figure 19:
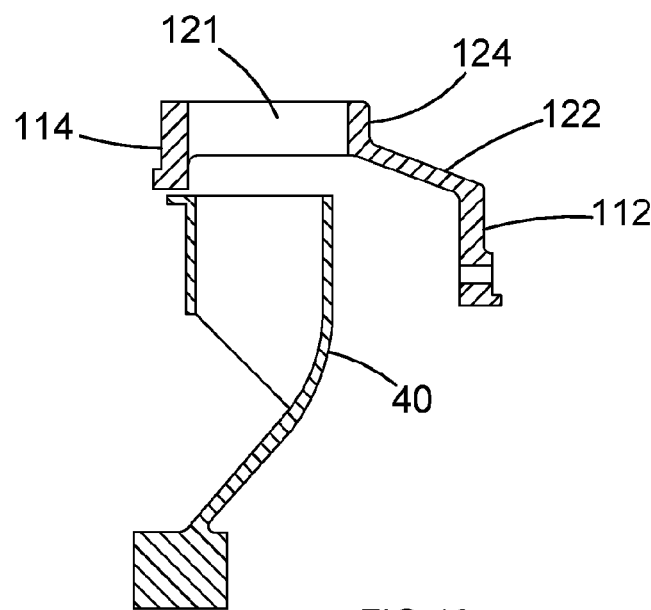
FIG. 19 is radial cross section through part of an adaptor and fan.

FIG. 19 shows a radial cross section through part of the adaptor of FIGS. 18A and 18B and through part of a fan located inside the adaptor. Referring to FIG. 19, in this embodiment the fan comprises fan blades 40 which are located axially in line with the reduced-size air outlets 121 in the adaptor. Thus air flow from the fan tends to be in line (axially) with the air outlets 121. As a consequence, the air flow is the same or similar to an adaptor without an angled wall. The angle of the wall also helps to prevent any reduction in air flow.

In the adaptor of FIGS. 18 and 19 a single angled wall 122 is provided at the top of the adaptor. However, an angled wall may be provided at different locations about the adaptor, and more than one angled wall may be provided if desired. In the arrangement shown, the angled wall 122 is closed. However, air holes could be provided in the angled wall if desired. In the arrangement shown, the angled wall 122 is flat. However the angled wall could instead be curved. In addition, the size of the angled wall may be adjusted to suit the circumstances.

Figure 20:
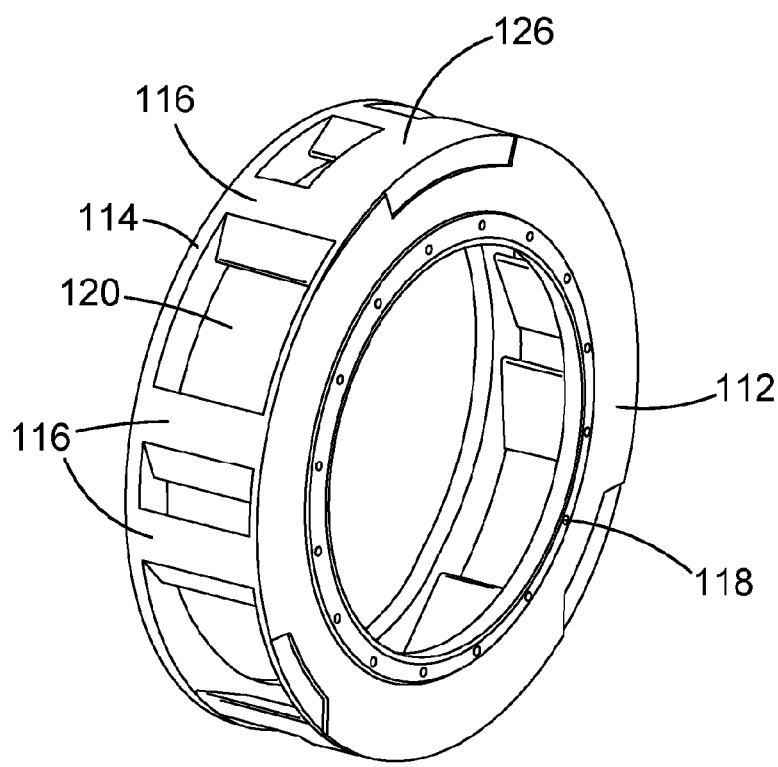
FIG. 20 is a perspective view of an adaptor in another embodiment.

FIG. 20 is a perspective view of an adaptor in another embodiment. Referring to FIG. 20, the adaptor comprises a front member 112, a rear member 114, and a plurality of cross members 116. The adaptor is designed to connect a generator frame to a flywheel housing and to surround a fan. The cross members 116 are in the form of wedge-shaped vanes between the front member 112 and the rear member 114, similar to the embodiments described above.

In the arrangement of FIG. 20, a peripheral wall 126 is provided in the outer part of the adaptor. The peripheral wall 126 extends from the front member 112 to a point part-way through the adaptor in an axial direction. The peripheral wall 126 also extends in a circumferential direction part-way around the adaptor, in this example between three adjacent cross members 116. When viewed in axial cross section, the peripheral wall 126 forms a curved arc with a radius of curvature centred on the axis of rotation of the machine. The peripheral wall 126 is used to partially close the top two air outlets. This may help to improve the mechanical stiffness of the adaptor, and may also provide increased ingress protection, for example, by reducing the likelihood of items falling into the adaptor. It will be appreciated that one or more peripheral walls may be provided, and the size of the or each peripheral wall in a circumferential and/or an axial direction may be varied to suit the circumstances.

Figure 21:
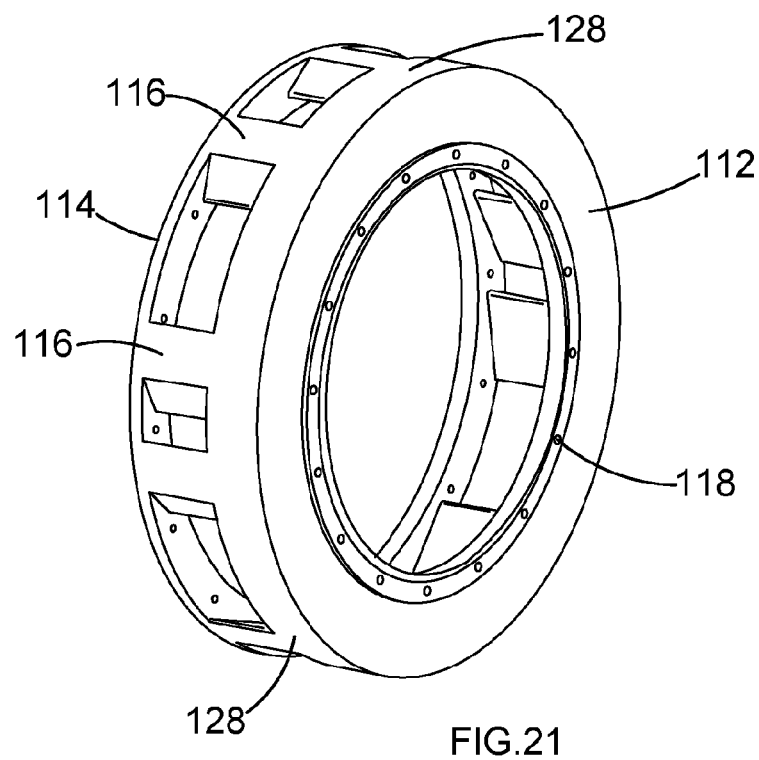
FIGS. 21 and 22 show an adaptor in another embodiment.
Figure 22:
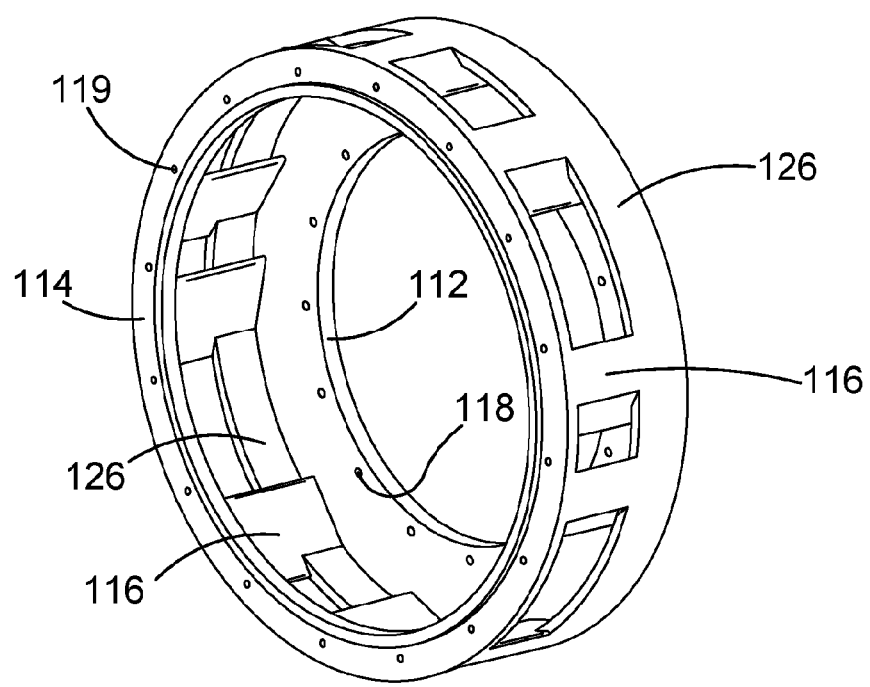

FIGS. 21 and 22 show an adaptor in another embodiment. Referring to FIGS. 21 and 22, the adaptor comprises a front member 112, a rear member 114, and a plurality of cross members 116. The cross members 116 are in the form of wedge-shaped vanes between the front member 112 and the rear member 114, similar to the embodiments described above. A peripheral wall 128 is provided which extends from the front member 112 to a point part-way through the adaptor in an axial direction. The peripheral wall 128 also extends in a circumferential direction all of the way around the adaptor. As a consequence all of the air outlets are partially closed. This arrangement may help to improve the mechanical stiffness and/or ingress protection, at the possible cost of some reduction in air flow or access to the coupling bolts. However, depending on the fan configuration used, it is possible or likely that air flow from the fan would be in line (axially) with the openings in the adaptor, in which case the air flow would remain the same or similar to that in an adaptor without the peripheral wall.

Figure 23:
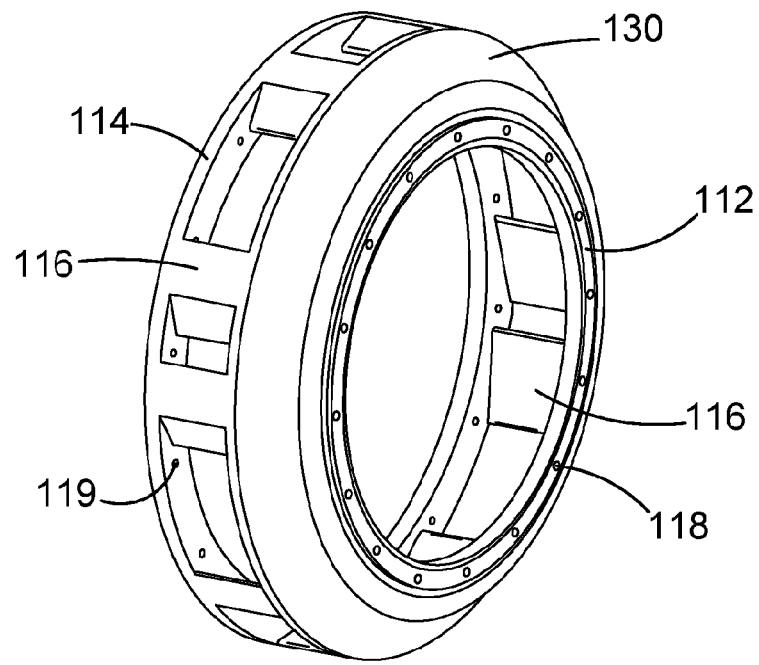
FIGS. 23 and 24 show an adaptor in another embodiment.
Figure 24:
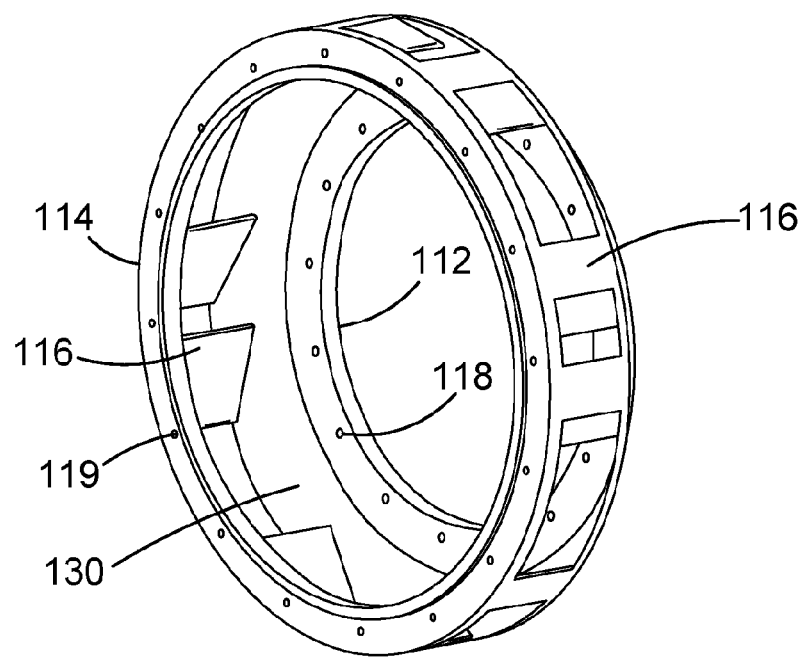

FIGS. 23 and 24 show an adaptor in another embodiment. Referring to FIGS. 23 and 24, the adaptor comprises a front member 112, a rear member 114, and a plurality of cross members 116. The cross members 116 are in the form of wedge-shaped vanes between the front member 112 and the rear member 114, similar to the embodiments described above. In this embodiment a tapered wall 130 is provided at the front of the adaptor. The tapered wall 130 extends from the front member 112 to a point part-way through the adaptor in an axial direction. In this example the tapered wall is frustoconical, although other shapes could be used instead. The tapered wall presents a front face which is angled with respect to the mating surface which connects the adaptor to the flywheel housing. The tapered wall 130 may help to increase mechanical stiffness, to increase ingress protection and/or to avoid the adaptor interfering with other components of the generator set. However, the curved profile shown in FIGS. 23 and 24 helps to reduce any reduction in air flow, since the curved surface allows a smoother exit for the air.

Figure 25:
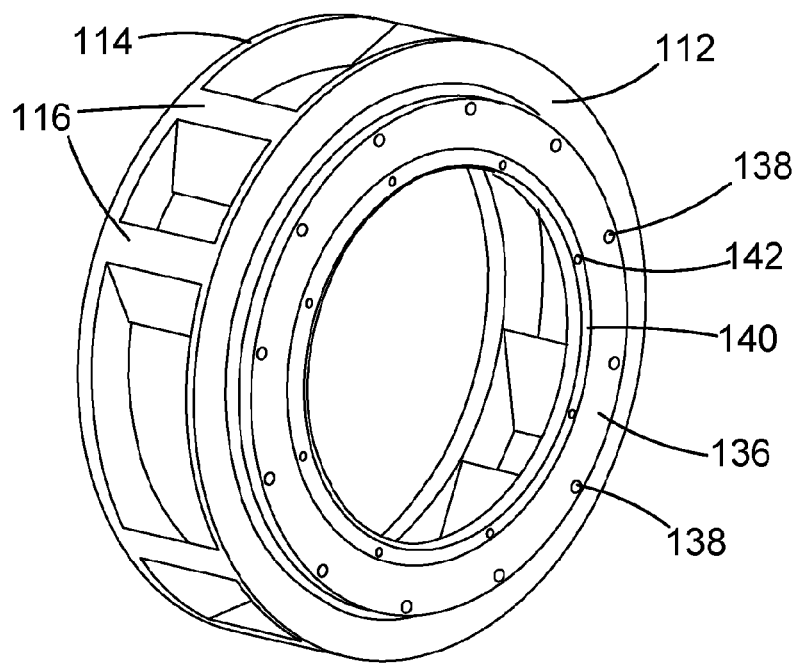
FIGS. 25 and 26 show an adaptor in another embodiment.
Figure 26:
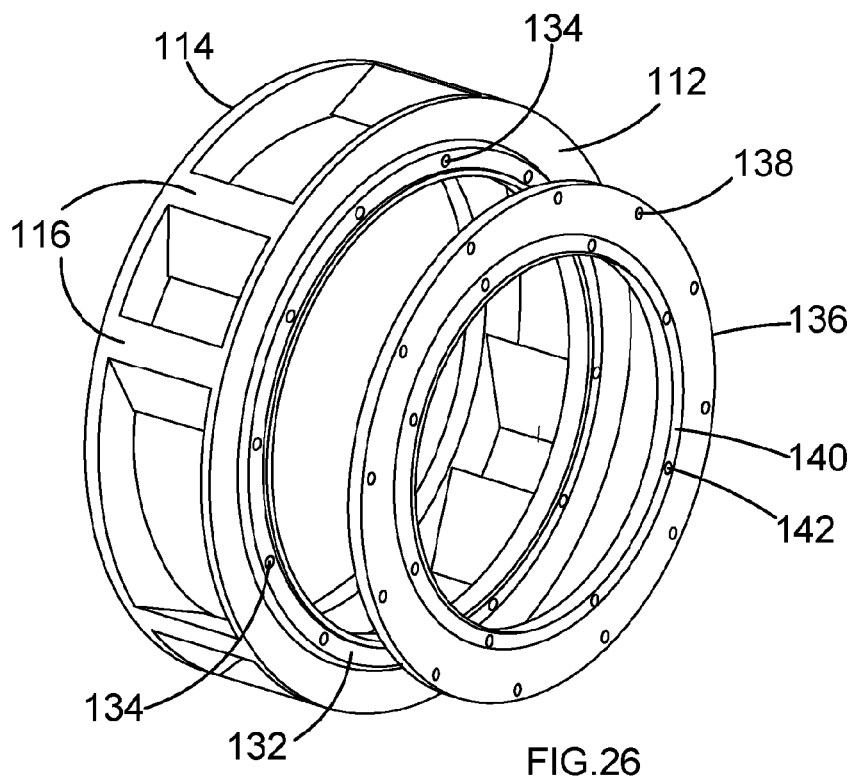

FIGS. 25 and 26 show an adaptor in another embodiment. Referring to FIGS. 25 and 26, the adaptor comprises a front member 112, a rear member 114, and a plurality of cross members 116. As in the previous embodiments, the front member 112 is arranged to connect the adaptor to a flywheel housing, the rear member 114 is arranged to connect the adaptor to the generator frame, and the cross members 116 provide the physical connections between the front and rear members. Bolt holes (not visible in FIGS. 25 and 26) are provided for connecting the rear member 114 to a generator frame. The adaptor is designed to surround a fan. The cross members 116 are in the form of wedge-shaped vanes between the front member 112 and the rear member 114.

In the arrangement of FIGS. 25 and 26, rather than being directly connected to the prime mover, the adaptor is connected to the prime mover via an adaptor ring 136. The front member 112 comprises a mating surface (spigot face) 132 which interfaces with a corresponding surface on the rear of the adaptor ring 136. A plurality of bolt holes 134 are provided in the mating surface 132, which are co-located with corresponding bolt holes 138 in the adaptor ring 136. A series of bolts is used to connect the adaptor ring 136 to the front member 114 through the respective bolt holes. The adaptor ring 136 is in the form of an annular disc with a mating surface (spigot face) 140 which interfaces with a corresponding surface on the flywheel housing. The mating surface 140 comprises a plurality of bolt holes 142 which are used to connect the adaptor ring 136 to the flywheel housing by means of a series of bolts.

In use, a plurality of differently sized adaptor rings 136 may be provided, to allow the adaptor to connect to a range of different prime movers without the need to provide a separate adaptor for each case. For example, the adaptor ring can be used to convert from one SAE size to a different (e.g. smaller) SAE size. The mating surface 132 and the bolt holes 134 may be of a standard configuration (such as an SAE size) or of a non-standard configuration.

Figure 27:
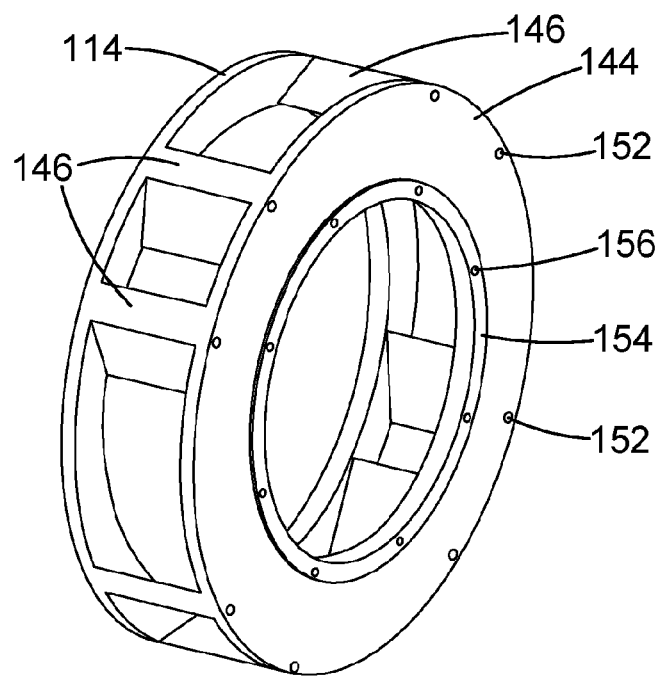
FIGS. 27 and 28 show an adaptor in another embodiment.
Figure 28:
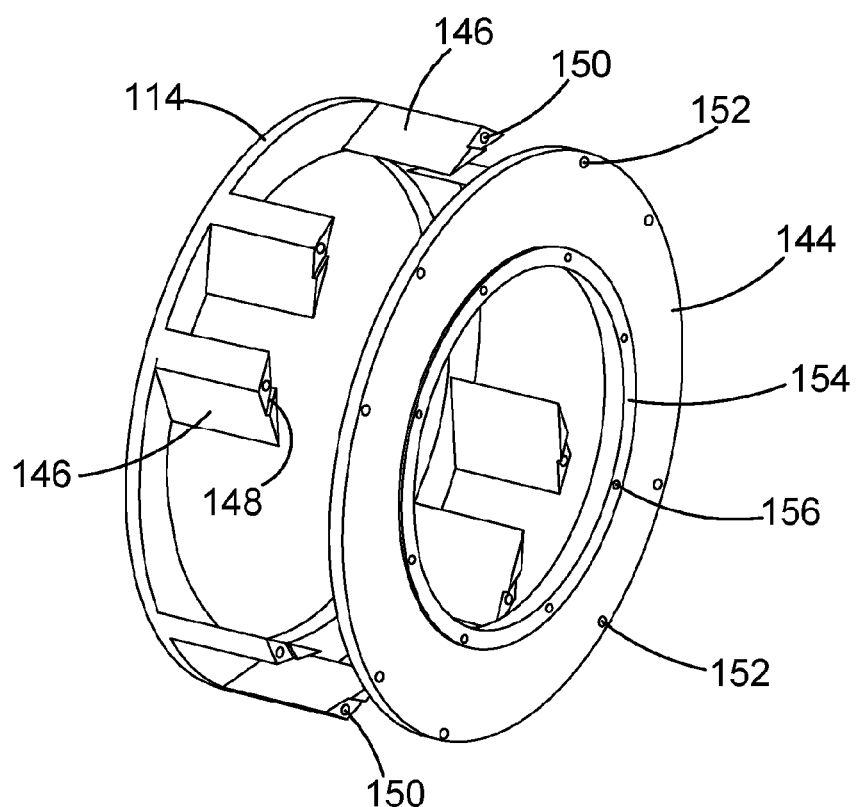

FIGS. 27 and 28 show an adaptor in another embodiment. Referring to FIGS. 27 and 28, the adaptor comprises a rear member 114 and a plurality of cross members 146. The rear member 114 is in the form of an annular disc and the cross members 146 are in the form of a series of wedge-shaped vanes which extend axially outwards from the rear member 114. The rear member 114 and cross members 146 are similar to those described above in the previous embodiments. However, in this embodiment, an adaptor ring 144 is connected directly to the cross members 146. Thus in this arrangement the adaptor ring 144 effectively forms a removable front member.

In the arrangement of FIGS. 27 and 28, the axially outward (front) face of each of the cross members 146 is designed to interface with a rear surface of the adaptor ring 144. The cross members 146 have locating features 148 which are used to locate the adaptor ring 144 on the cross members 146. Bolt holes 150 are provided in the cross members 146, in order to connect the adaptor ring to the adaptor. The adaptor ring 144 is in the form of an annular disc. A plurality of bolt holes 152 are provided in the adaptor ring to connect the adaptor ring to the cross members using a series of bolts. The adaptor ring 144 comprises a mating surface (spigot face) 154 which interfaces with a corresponding surface on the flywheel housing. The mating surface 154 comprises a plurality of bolt holes 156 which are used to connect the adaptor ring 144 to the flywheel housing by means of a series of bolts.

As in the arrangement of FIGS. 25 and 26, a plurality of differently sized adaptor rings 144 may be provided, to allow the adaptor to connect to a range of different prime movers without the need to provide a separate adaptor for each case.

In the arrangement shown in FIG. 28, the locating features 148 on the cross members 146 are machined spigots. However, other types of locating feature, such as dowel pins, could be used instead to align the adaptor ring to the cross members. This is also true for all other connections mentioned in the present specification, including the adaptor to flywheel connection.

Figure 29:
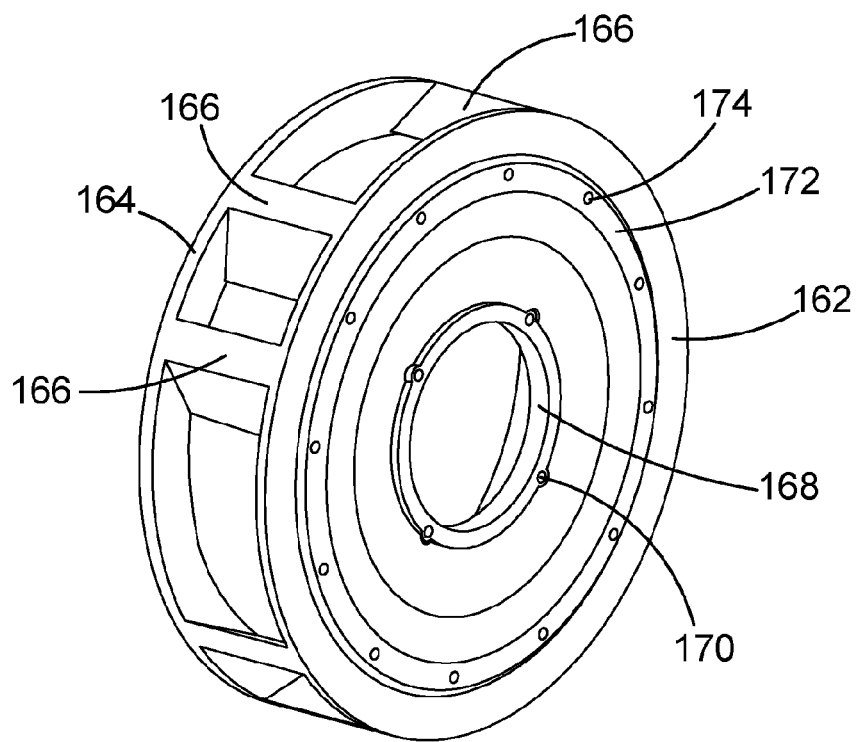
FIGS. 29 and 30 show a bracket in another embodiment.
Figure 30:
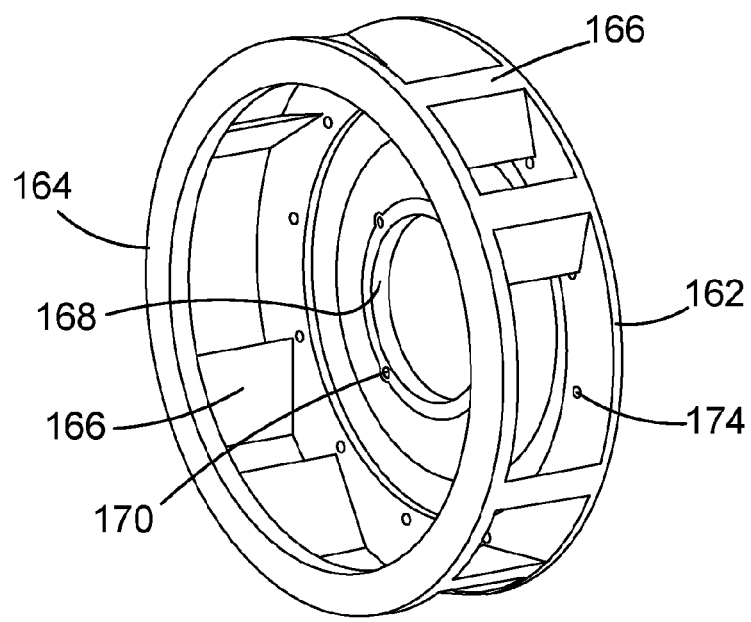

FIGS. 29 and 30 show a component in another embodiment. In this case the component is a bracket which is designed for use with a two-bearing generator. Referring to FIGS. 29 and 30, the bracket comprises a front (drive end) member 162, a rear (non-drive end) member 164, and a plurality of cross members 166. The rear member 164 is arranged to connect the bracket to the generator frame. The plurality of cross members 166 provide the physical connections between the front member 162 and the rear member 164. The bracket is designed to surround a fan. The cross members 166 are in the form of wedge-shaped vanes, as in the previous embodiments. A bearing support 168 is provided at the centre of the front member 162, which is used to support a bearing housing. The bearing support 168 comprises a plurality of bolt holes 170 for bolting the bearing housing to the bearing support. This can allow the bracket to be used with a two-bearing generator, in which one end of the generator shaft is supported by bearings held by the bracket rather than using engine bearings.

The bracket of FIGS. 29 and 30 also comprises a mating surface 172 with a plurality of bolt holes 174. The mating surface 172 and bolt holes 174 can be used to connect a separate adaptor to the bracket. The adaptor can be used to connect the bracket to the prime mover, in a similar way to the adaptor 100 described above with reference to FIG. 17. Alternatively, the bracket and adaptor may be provided as a single component.

The bracket of FIGS. 29 and 30 has a circular design, similar to that of the adaptor of FIGS. 18 to 28, which may provide advantages from a structural, space and cost perspective.

In the arrangement shown in FIGS. 29 and 30 the bracket is used to support a single bearing. However, it is possible that for larger machines the bracket could support two bearings (such as one roller bearing and one radial ball bearing).

Figure 31:
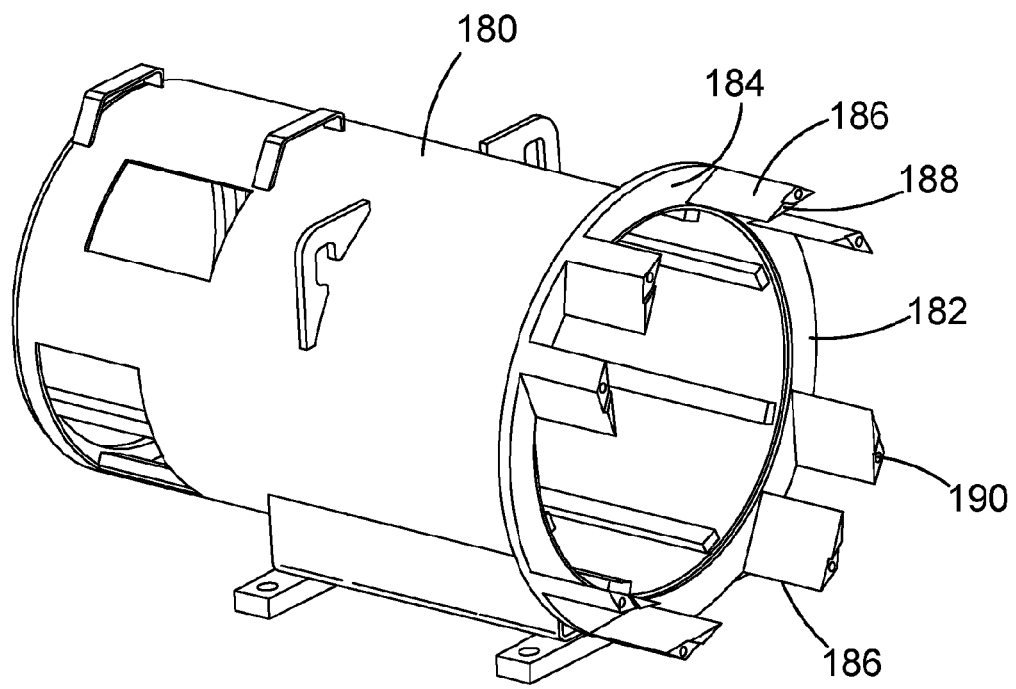
FIGS. 31 and 32 show an adaptor and a generator frame assembly in another embodiment.

FIG. 31 shows parts of an adaptor and a generator frame assembly in another embodiment. In this embodiment, the adaptor and the generator frame are provided as a single component. As in previous embodiments, the adaptor is used to connect the generator frame to a flywheel housing and to surround a fan.

Referring to FIG. 31, the generator frame 180 is in the form of a cylindrical housing which is arranged to house the generator (not shown). Integral with the generator frame 180 is an adaptor 182. The adaptor 182 comprises a rear member 184 and a plurality of cross members 186. The rear member 184 is in the form of an annular disc at the drive end of the generator frame. The cross members 186 are in the form of a series of wedge-shaped vanes which extend axially outwards from the rear member 184. The axially outward (front) face of each of the cross members 186 is designed to interface with a rear surface of an adaptor ring. The cross members 186 have locating features 188 which are used to locate the adaptor ring on the cross members 186. Bolt holes 190 are provided in the cross members 186, in order to connect the adaptor ring to the adaptor. The combined adaptor and generator frame assembly may be manufactured using any appropriate technique such as fabrication.

In the arrangement shown in FIG. 31, the locating features 188 on the cross members 186 are machined spigots, similar to those of FIG. 28. However, other types of locating feature, such as dowel pins, could be used instead to align the adaptor ring to the cross members.

Figure 32:
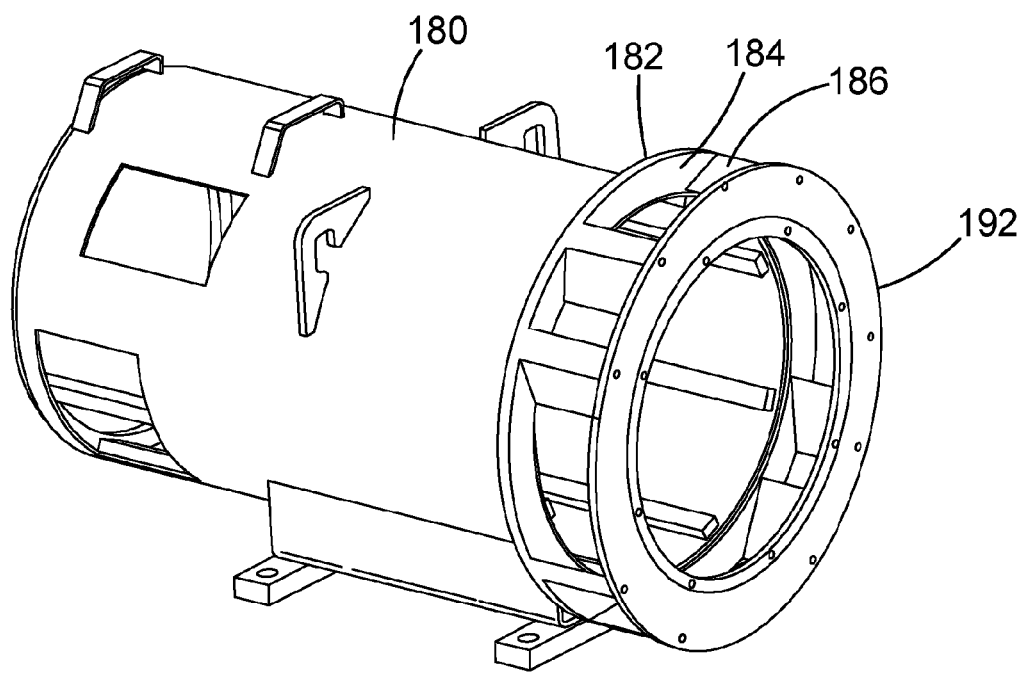

FIG. 32 shows the adaptor and generator frame assembly with an adaptor ring 192 connected. The adaptor ring 192 may be the same as or similar to the adaptor ring 144 described above with reference to FIGS. 27 and 28. A plurality of differently sized adaptor rings may be provided, to allow the adaptor to connect to a range of different prime movers without the need to provide a separate adaptor and generator frame assembly for each case.

If desired, a combined adaptor and generator frame assembly could be provided using any of the adaptor designs described herein. Similarly, a combined bracket and generator frame assembly could be provided using any of the bracket designs described herein.

In the various embodiments described above, the cross members have a triangular cross section. A benefit of this shape is the strength provided when using cast adapters or brackets. However, other cross-sectional shapes and/or other production techniques could be used instead.

Figure 33:
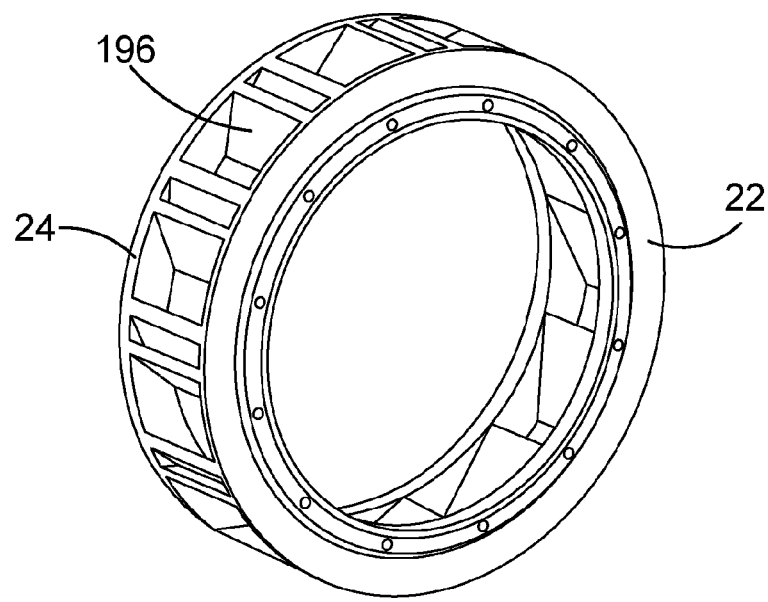
FIGS. 33 and 34 show an adaptor in another embodiment.
Figure 34:
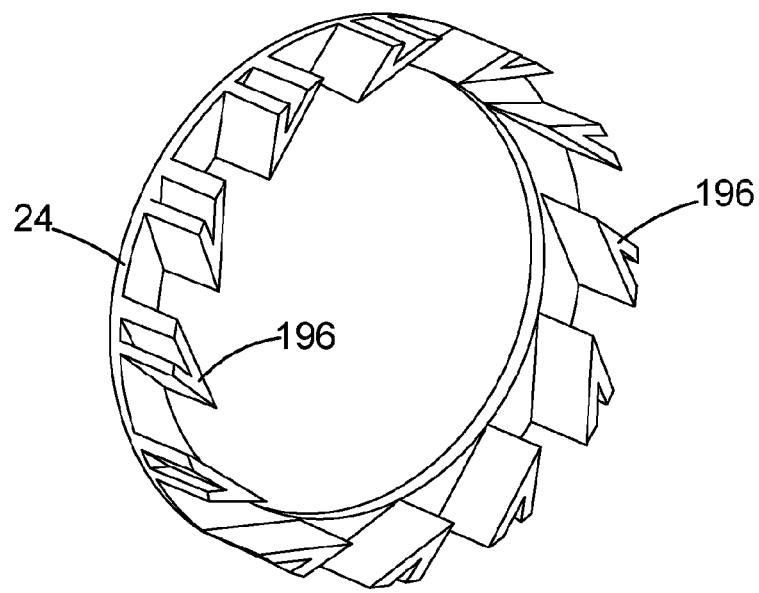

FIGS. 33 and 34 show an adaptor in another embodiment of the invention. The adaptor of FIGS. 33 and 34 has a circular design similar to that of FIGS. 3 and 4. In the arrangement of FIGS. 33 and 34, the cross members 196 are in the form of a series of wedge-shaped vanes between the front member 22 and the rear member 24, as in previous embodiments. Thus, the cross members 196 have two side surfaces which are inclined towards each other and meet together at an edge on the radially inwards side of the adaptor. However, in this embodiment, the cross members 196 have a V-shaped cross-section, rather than a triangular cross-section. Thus, the outer surfaces of the cross members 196 are discontinuous in a circumferential direction around the adaptor.

Although not shown, the V-shaped cross-section of the cross members could also extend through the front and rear walls (front member 22 and rear member 24). Cross members with a V-shaped cross-section could also be used with any of the other embodiments described above. Furthermore, any other appropriate cross section could be used instead.

Figure 35:
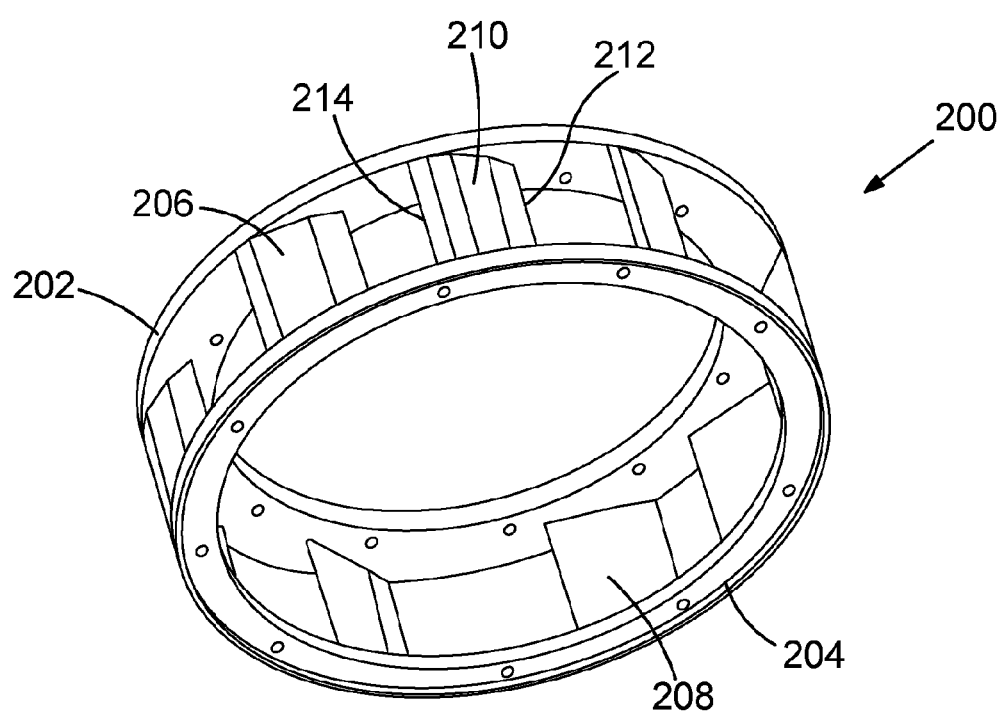
FIG. 35 shows an adaptor in a further embodiment.

FIG. 35 shows an adaptor in a further embodiment. In this embodiment, the adaptor is made from fabricated steel. This may provide higher strength than, for example, cast iron, which may permit thinner cross members to be used.

Referring to FIG. 35, the adaptor 200 comprises a comprises a front member 202, a rear member 204, and a plurality of cross members 206. As in previous embodiments, the front member 202 is arranged to connect the adaptor to a flywheel housing, the rear member 204 is arranged to connect the adaptor to the generator frame, and the cross members 206 provide the physical connections between the front and rear members. However, in this embodiment, the cross members form an essentially aerofoil shape when seen in cross section.

In the arrangement of FIG. 35, each of the cross members 206 comprises a radially inward side 208 and a radially outward side 210. The radially inward side 208 is essentially planar, and extends from an inward edge 212 to an outward edge 214. However, the radially outward side 210 comprises a series of planar surfaces, each of which is at an angle to an adjacent surface. The direction of the radially outwards side, away from the inner edge 212, gradually changes towards the radially inward side, until the radially outwards side 210 meets the radially inward 208 side at the outer edge 214. Thus the cross member has a cross section, when viewed axially, which is thinner towards the inward edge 212 and the outward edge 214, and thicker towards the centre of the cross member.

A centre line through a cross member 206 (a notional line from the inner edge 212 through the centre of the cross member) is at an angle θ with respect to the radial direction, when viewed axially. The value of the angle θ is chosen to be approximately the same as the angle at which air flow exits the fan. A suitable value of the angle θ has been found to be greater than 45° and/or less than 90°, for example between 70° and 85°. As in previous embodiments, the selection of values of parameters such as the angle θ, the thickness of a cross member, and total number of cross members is a compromise between strength, aerodynamics and physical constraints, and may vary to suit the circumstances.

In the arrangement shown in FIG. 35, the inward side 208 has a single planar surface, although if desired it could comprise a plurality of surfaces and/or a curved surface. Furthermore, if desired, the outward side 210 could comprise one or more curved surfaces.

The cross member design of FIG. 35 may advantageous in that it presents a narrow edge 212 to the air flow, while also allowing the cross member to have a thinner, more aerodynamically-efficient shape than some other designs.

Embodiments of the present invention have been described by way of example only, and modifications in detail will be apparent to the skilled person. For example, the cross members and/or vanes may have different dimensions, orientations and numbers than those shown. Furthermore, it will be appreciated that features of one embodiment may be used with any of the other embodiments.

The invention claimed is:

1. An adaptor arranged to connect between a generator and a prime mover in a power generation system, the adaptor comprising:
a rear member arranged to be connected to the generator;
a front member arranged to be connected to the prime mover; and
a plurality of cross members which connect the front member to the rear member,
wherein the adaptor is arranged to house a fan, and
wherein the cross members are wedge-shaped, with an edge on a radially inwards end of the cross member and two side surfaces each of which extends radially outwards from the edge, and the width of the cross members increases with increasing distance from the inside of the adaptor.

2. The adaptor according to claim 1, wherein the two side surfaces are inclined with respect to each other and meet at the edge on the radially inward end of the cross member.

3. The adaptor according to claim 1, wherein each cross member has an outside surface which extends between the two side surfaces, and the two side surfaces are longer than the outside surface.

4. The adaptor according to claim 1, wherein:
the cross members have an axial cross section which is substantially triangular;
one vertex of the triangle lies on the radially inwards end of the cross member; and
the other two vertices lie on the radially outwards end of the cross member.

5. The adaptor according to claim 1, wherein the cross members are angled with respect to a radial direction.

6. The adaptor according to claim 1, wherein the cross members have a center line which is at an angle approximately equal to an angle at which airflow exits the fan.

7. The adaptor according to claim 1, wherein a gap between adjacent cross members increases with increasing distance from the inside of the adaptor.

8. The adaptor according to claim 1, wherein at least one of the front member and the rear member comprises at least one area with a reduced depth in a radial direction, and a gap between two adjacent cross members in a circumferential direction is greater in an area with reduced depth.

9. The adaptor according to claim 1, further comprising at least one removable cover, wherein at least one removable cover comprises a wedge-shaped vane.

10. The adaptor according to claim 1, wherein the adaptor includes a peripheral wall which extends between the front member and a point part way through the adaptor in an axial direction.

11. A generator set comprising a generator, a prime mover and a component connected between the generator and the prime mover, the component comprising:
a rear member connected to the generator;
a front member which is at least one of: connected to the prime mover or supporting the bearing; and
a plurality of cross members which connect the front member to the rear member,
wherein the component is arranged to house a fan, and
wherein the cross members are wedge-shaped, with an edge on a radially inwards end of the cross member and two side surfaces each of which extends radially outwards from the edge, and the width of the cross members increases with increasing distance from the inside of the component.

12. A bracket arranged to connect between a generator and a prime mover in a power generation system, the bracket comprising:
a rear member arranged to be connected to the generator;
a front member arranged to support a bearing; and
a plurality of cross members which connect the front member to the rear member,
wherein the bracket is arranged to house a fan, and
wherein the cross members are wedge-shaped, with an edge on a radially inwards end of the cross member and two side surfaces each of which extends radially outwards from the edge;
and the width of the cross members increases with increasing distance from the inside of the bracket.

13. A bracket according to claim 12, wherein the two side surfaces are inclined with respect to each other and meet at the edge on the radially inward end of the cross member.

14. A bracket according to claim 12, wherein each cross member has an outside surface which extends between the two side surfaces, and the two side surfaces are longer than the outside surface.

15. A bracket according to claim 12, wherein:
the cross members have an axial cross section which is substantially triangular;
one vertex of the triangle lies on the radially inwards end of the cross member; and
the other two vertices lie on the radially outwards end of the cross member.

16. A bracket according to claim 12, wherein the cross members are angled with respect to a radial direction.

17. A bracket according to claim 12, wherein and the cross members have a centre line which is at an angle approximately equal to an angle at which airflow exits the fan.

18. A bracket according to claim 12, wherein a gap between adjacent cross members increases with increasing distance from the inside of the bracket.

19. A bracket according to claim 12, wherein at least one of the front member and the rear member comprises at least one area with a reduced depth in a radial direction, and a gap between two adjacent cross members in a circumferential direction is greater in an area with reduced depth.

20. A bracket according to claim 12, further comprising at least one removable cover, wherein at least one removable cover comprises a wedge-shaped vane.

* * * * *